United States Patent
Hirotsu et al.

(10) Patent No.: US 10,186,146 B2
(45) Date of Patent: Jan. 22, 2019

(54) ABNORMALITY DETECTION DEVICE, ABNORMALITY DETECTION SYSTEM, AND METHOD

(71) Applicant: PANASONIC INTELLECTUAL PROPERTY MANAGEMENT CO., LTD., Osaka (JP)

(72) Inventors: Yuzo Hirotsu, Kanagawa (JP); Koichiro Iwaoka, Kanagawa (JP)

(73) Assignee: PANASONIC INTELLECTUAL PROPERTY CO., LTD., Osaka (JP)

( * ) Notice: Subject to any disclaimer, the term of this patent is extended or adjusted under 35 U.S.C. 154(b) by 0 days.

(21) Appl. No.: 15/538,880

(22) PCT Filed: Dec. 18, 2015

(86) PCT No.: PCT/JP2015/006333
§ 371 (c)(1),
(2) Date: Jun. 22, 2017

(87) PCT Pub. No.: WO2016/103669
PCT Pub. Date: Jun. 30, 2016

(65) Prior Publication Data
US 2017/0345294 A1    Nov. 30, 2017

(30) Foreign Application Priority Data
Dec. 26, 2014   (JP) .................. 2014-265614

(51) Int. Cl.
*G08G 1/01* (2006.01)
*G08G 1/08* (2006.01)
(Continued)

(52) U.S. Cl.
CPC ....... *G08G 1/0141* (2013.01); *G01C 21/3691* (2013.01); *G08G 1/0112* (2013.01);
(Continued)

(58) Field of Classification Search
CPC .. G08G 1/0141; G08G 1/0112; G08G 1/0116; G08G 1/0129; G01C 21/3691
See application file for complete search history.

(56) References Cited

U.S. PATENT DOCUMENTS

| | | | |
|---|---|---|---|
| 2008/0046165 A1 | 2/2008 | Downs et al. | |
| 2010/0106404 A1* | 4/2010 | Kim | ............ G06Q 10/109 |
| | | | 701/465 |
| 2017/0046958 A1* | 2/2017 | Naka | ............ G08G 1/09 |

FOREIGN PATENT DOCUMENTS

| | | |
|---|---|---|
| JP | 2009-529187 | 8/2009 |
| JP | 4985825 | 7/2012 |
| JP | 5298712 | 9/2013 |

OTHER PUBLICATIONS

International Search Report, dated Feb. 2, 2016 by the Japan Patent Office (JPO), in the corrresponding International Application No. PCT/JP2015/006333.

* cited by examiner

*Primary Examiner* — Richard M Camby
(74) *Attorney, Agent, or Firm* — Greenblum & Bernstein, P.L.C.

(57) ABSTRACT

An abnormality detection device of an embodiment includes a traffic control center device to detect an abnormality of vehicle detectors installed in a road network, including: a first traffic management unit that collects detector information including measurement quantities from the vehicle detectors; a statistical processing unit that statistically processes the measurement quantities for each designated period to generate statistical information including statistical values of the measurement quantities; a map information generating unit that generates, based on the statistical values of the measurement quantities of the vehicle detectors that already have been determined to be abnormal by a user, map
(Continued)

information representing a distribution situation of the statistical values of the measurement quantities in an abnormal state; and a detector state determination unit that determines, based on the measurement quantities of each vehicle detector to be assessed and the map information in the abnormal state, whether the vehicle detector is abnormal.

15 Claims, 19 Drawing Sheets

(51) Int. Cl.
*G01C 21/36* (2006.01)
*G08G 1/017* (2006.01)
*G08G 1/097* (2006.01)

(52) U.S. Cl.
CPC ......... *G08G 1/0116* (2013.01); *G08G 1/0129* (2013.01); *G08G 1/0145* (2013.01); *G08G 1/0175* (2013.01); *G08G 1/08* (2013.01); *G08G 1/097* (2013.01)

Fig.5 first set of categorization conditions

|  |  | installation distance relative to signal intersection | | | | installation above right turn only lane |
|---|---|---|---|---|---|---|
|  |  | ~50m | ~150m | ~300m | ~500m | |
| green time ratio | ~30% | category(1) | category(2) | category(3) | category(4) | category(5) |
| | ~40% | category(6) | category(7) | category(8) | category(9) | category(10) |
| | ~60% | category(11) | category(12) | category(13) | category(14) | category(15) |
| | ~70% | category(16) | category(17) | category(18) | category(19) | category(20) |
| | ~100% | category(21) | category(22) | category(23) | category(24) | category(25) |

(A)

second set of categorization conditions in the case of failure cause B in the case of failure cause A

|  |  | installation distance relative to signal intersection | | | | installation above right turn only lane |
|---|---|---|---|---|---|---|
|  |  | ~50m | ~150m | ~300m | ~500m | |
| green time ratio | ~30% | category(26) | category(27) | category(28) | category(29) | category(30) |
| | ~40% | | | | | |
| | ~60% | | | | | |
| | ~70% | | | | | |
| | ~100% | | | | | |

|  |  | installation distance relative to signal intersection | | | | installation above right turn only lane |
|---|---|---|---|---|---|---|
|  |  | ~50m | ~150m | ~300m | ~500m | |
| green time ratio | ~30% | category(1) | category(2) | category(3) | category(4) | category(5) |
| | ~40% | category(6) | category(7) | category(8) | category(9) | category(10) |
| | ~60% | category(11) | category(12) | category(13) | category(14) | category(15) |
| | ~70% | category(16) | category(17) | category(18) | category(19) | category(20) |
| | ~100% | category(21) | category(22) | category(23) | category(24) | category(25) |

(B)

Fig.9
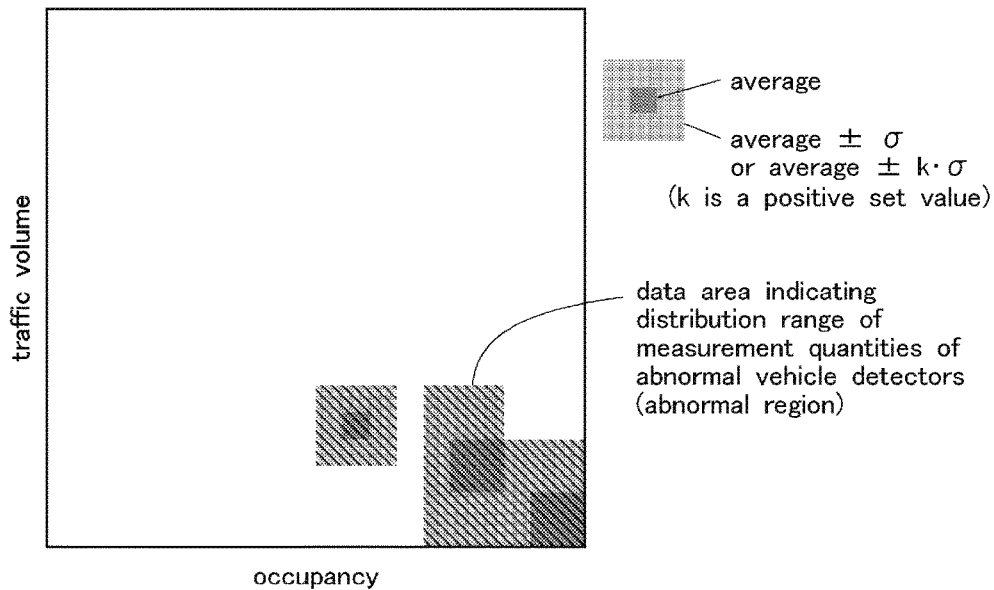
(A) second categorized map
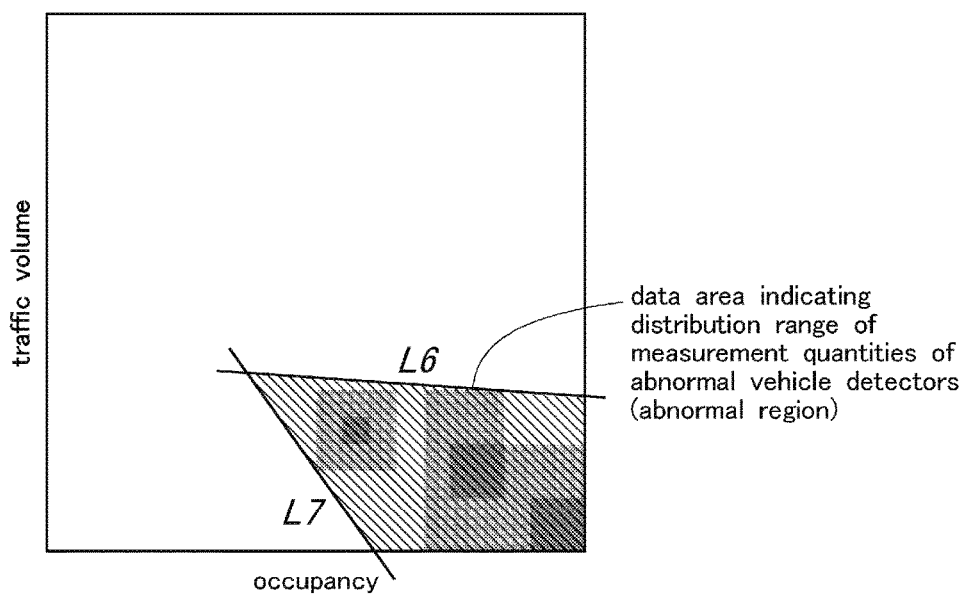
(B)

congestion situation display screen

⬅︎ arrow representing congestion state

⇐ arrow representing traffic abnormal state traffic volume level display screen

⬅ red: equal to or larger than average + k·σ
⬅ orange: average + k·σ ~ average + σ
⬅ green: average + σ ~ average - σ
⬅ blue: average - σ ~ average - k·σ
⬅ purple: equal to or smaller than average - k·σ
(k is a positive set value)

ABNORMALITY DETECTION DEVICE, ABNORMALITY DETECTION SYSTEM, AND METHOD

TECHNICAL FIELD

The present invention relates to an abnormality detection device and an abnormality detection system for detecting an abnormality of vehicle detectors installed in a road network, and a program for causing a computer to function as an abnormality detection device.

BACKGROUND ART

In a traffic control system, measurement quantities related to the traffic volume, etc. are collected from a lot of vehicle detectors installed in a road network, and based on the measurement quantities, traffic signals are controlled and traffic information to be provided to vehicle drivers is generated. Thus, the vehicle detectors play a core role in the traffic control system, and consequently, an abnormality (malfunction or operational abnormality) thereof can cause a significant decrease in the system performance. Therefore, it is desired to quickly detect an abnormality of the vehicle detectors.

JP5298712B2 discloses detecting an abnormality of the vehicle detectors by use of probe information (information on travel paths of vehicles) that is collected to generate traffic information to be provided to vehicle drivers.

Also, in the traffic control system, a traffic situation based on the measurement quantities of the vehicle detectors is displayed on a screen, and a user (such as a traffic manager and a road manager) conducts monitoring with this screen. In this monitoring, if the user is allowed to analyze the traffic situation and notice an abnormality of the traffic situation, namely, a state in which the traffic situation is significantly different from that in an ordinary time, the user will be able to make a decision regarding traffic guidance, traffic signal intervention, etc. properly.

JP4985825B2 discloses analyzing the control situation of traffic signals with a traffic signal control analysis device and displaying the analysis result on a display device.

SUMMARY OF THE INVENTION

An abnormality detection device according to an embodiment of the present invention detects an abnormality of vehicle detectors installed in a road network. The abnormality detection device comprises: a detector information collector that collects detector information including measurement quantities from the vehicle detectors; a map information generator that generates, based on the measurement quantities of the vehicle detectors that already have been determined to be abnormal by a user, map information representing a distribution situation of the measurement quantities in an abnormal state; and a detector state determiner that determines, based on the measurement quantity of each vehicle detector to be assessed and the map information in the abnormal state, whether the vehicle detector is abnormal.

BRIEF DESCRIPTION OF THE DRAWINGS

FIG. 5 is an explanatory diagram illustrating in (A) and (B) an example of categorization conditions used by the categorizing unit 22;

FIG. 9 is an explanatory diagram illustrating in (A) and (B) a second categorized map visualizing second categorized map information generated by a second categorized map information generating unit 84;

EMBODIMENTS FOR CARRYING OUT THE INVENTION

Figure 1:
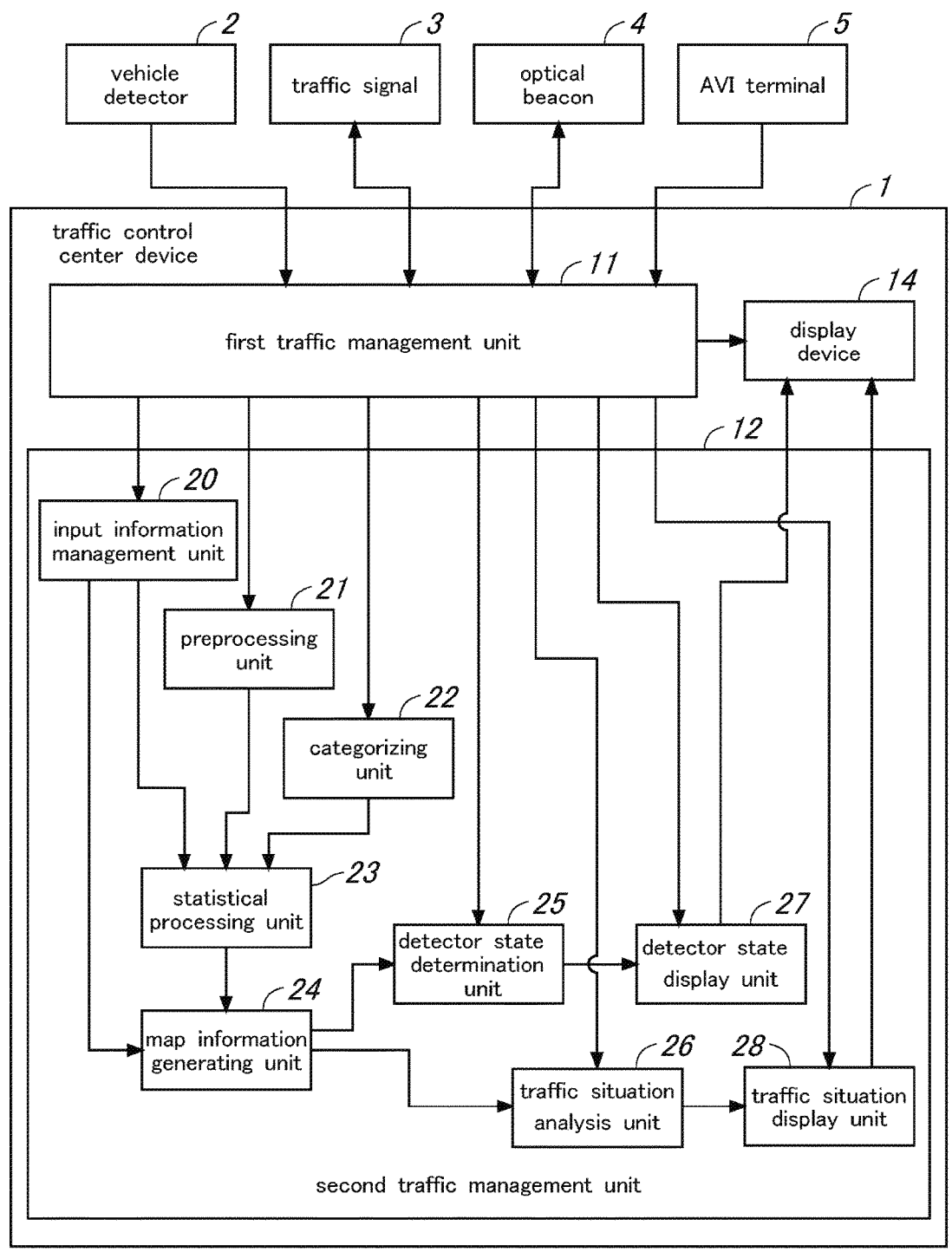
FIG. 1 is an overall configuration diagram of a traffic control center device 1 according to the present embodiment.

An abnormality detection device according to an embodiment of the present invention detects an abnormality of vehicle detectors installed in a road network. The abnormality detection device comprises: a detector information collector that collects detector information including measurement quantities from the vehicle detectors; a map information generator that generates, based on the measurement quantities of the vehicle detectors that already have been determined to be abnormal by a user, map information representing a distribution situation of the measurement quantities in an abnormal state; and a detector state determiner that determines, based on the measurement quantity of each vehicle detector to be assessed and the map information in the abnormal state, whether the vehicle detector is abnormal.

According to this configuration, by comparing the map information representing the distribution situation of the measurement quantities in the abnormal state and the measurement quantities of the vehicle detector to be assessed, an abnormality of the vehicle detector can be detected with high accuracy. Further, because the vehicle detector abnormality detection device does not require a device for collecting information other than the vehicle detectors, it is highly feasible and can be realized at a relatively low cost with a center device of a traffic control system, for example. It is to be noted here that an abnormality of a vehicle detector may include a malfunction due to a deterioration of elements of the vehicle detector or the like and an abnormal operation due to obstruction of transmission and reception of detection signals by growth of trees.

The abnormality detection device according to an embodiment of the present invention further comprises a statistical processor that statistically processes the measurement quantities for each designated period to thereby generate statistical information including statistical values of the measurement quantities, wherein the map information generator generates map information in the abnormal state based on the statistical values of the measurement quantities.

According to this configuration, because the measurement quantities are statistically processed, it is possible to suppress an influence of noises (disturbances) contained in the measurement quantities and thereby improve the accuracy of abnormality detection of the vehicle detectors.

The abnormality detection device according to an embodiment of the present invention further comprises a categorizer that classifies the vehicle detectors into a plurality of categories in accordance with a prescribed categorization condition regarding a factor having an influence on a traffic situation at installation points the vehicle detectors, wherein: the map information generator generates categorized map information representing the distribution situation of the measurement quantities for each category; and the detector state determiner determines whether the vehicle detector is abnormal based on the categorized map information.

According to this configuration, with the use of the categorized map information, an abnormality of the vehicle detector can be detected with high accuracy.

The abnormality detection device according to an embodiment of the present invention further comprises a categorizer that classifies the vehicle detectors that already have been determined to be abnormal by the user into a plurality of categories in accordance with a prescribed categorization condition regarding abnormality causes of the vehicle detectors, wherein: the map information generator generates categorized map information representing the distribution situation of the measurement quantities for each category; and the detector state determiner determines whether the vehicle detector is abnormal based on the categorized map information.

According to this configuration, with the use of the map information generated for each category divided based on the abnormality causes, an abnormality of the vehicle detector can be detected with high accuracy.

In the abnormality detection device according to an embodiment of the present invention, the detector state determiner infers an abnormality cause of the vehicle detector to be assessed based on the categorized map information.

According to this configuration, when the vehicle detector to be assessed is determined to be abnormal, the cause of the abnormality can be presented to the user. In addition, the use of the map information generated for each abnormality cause allows the abnormality cause to be inferred with high accuracy.

In the abnormality detection device according to an embodiment of the present invention, the map information generator generates map information representing the distribution situation of the measurement quantities in a normal state based on the measurement quantities of the vehicle detectors that have not been determined to be abnormal by the user; and the detector state determiner determines, based on the map information in the abnormal state and the map information in the normal state, whether the vehicle detector is abnormal, normal, or in a state that requires attention.

According to this configuration, it is possible to determine whether the vehicle detector to be assessed is normal. In addition, it is possible to determine whether the vehicle detector to be assessed is in a state that requires attention, which is a state neither abnormal nor normal.

In the abnormality detection device according to an embodiment of the present invention, the categorization condition pertains to a distance from each vehicle detector to a signal intersection having an incoming road consisting of a road where the vehicle detector is installed, a green time ratio associated with the incoming road of a traffic signal installed at the signal intersection, and whether the vehicle detector is installed above a right turn only lane.

According to this configuration, the vehicle detectors can be categorized properly, and therefore, the abnormality detection of the vehicle detectors based on the map information can be performed with high accuracy.

In the abnormality detection device according to an embodiment of the present invention, the map information generator excludes, from data to be processed, the measurement quantities during a period when at least one of a special event and a traffic restriction is occurring.

According to this configuration, it is possible to prevent the measurement quantities during the period when a special event, such as a natural disaster or an entertainment event, or a traffic restriction is occurring from being reflected in the map information, and therefore, the accuracy of the map information as information representing the abnormal state and normal state of the vehicle detectors themselves can be improved.

In the abnormality detection device according to an embodiment of the present invention, the statistical processor excludes, from data to be processed, the measurement quantities during a period when at least one of a special event and a traffic restriction is occurring.

According to this configuration, it is possible to prevent the measurement quantities during the period when a special event, such as a natural disaster or an entertainment event, or a traffic restriction is occurring from being reflected in the statistical information, and therefore, the accuracy of the statistical information as information representing the abnormal state and normal state of the vehicle detectors themselves can be improved.

In the abnormality detection device according to an embodiment of the present invention, the map information is based on a combination of a traffic volume and an occupancy.

According to this configuration, it is possible to detect an abnormality of the vehicle detectors with high accuracy based on the map information. It is to be noted that, besides the combination of the traffic volume and occupancy, the map information may be based on the combination of the traffic volume and abnormal pulse generation frequency or based on the combination of the occupancy and abnormal pulse generation frequency.

The abnormality detection device according to an embodiment of the present invention further comprises: a traffic situation determiner that determines whether a traffic situation represented by the measurement quantities of the vehicle detectors that were not determined to be abnormal by the detector state determiner is abnormal; and a traffic situation displayer that displays, on a display device, an abnormality of the traffic situation based on a determination result of the traffic situation determiner.

According to this configuration, it is possible to properly analyze the traffic situation based on the measurement quantities of the vehicle detectors and to present an abnormality of the traffic situation to the user with high accuracy.

In the abnormality detection device according to an embodiment of the present invention, based on the determination result of the traffic situation determiner, the traffic situation displayer distinguishably displays, in a screen showing the traffic situation at each link of the road network, links corresponding to the vehicle detectors with regard to which the traffic situation has been determined to be abnormal.

According to this configuration, the user is allowed to grasp the links with an abnormal traffic situation.

In the abnormality detection device according to an embodiment of the present invention, based on the determination result of the traffic situation determiner, the traffic situation displayer distinguishably displays, in a screen showing the traffic situation at each link of the road network, a degree of abnormality of the traffic volume at each of the links corresponding to the vehicle detectors.

According to this configuration, the user is allowed to grasp the degree of abnormality of the traffic volume at each link.

The abnormality detection device according to an embodiment of the present invention further comprises a map information generator that generates, for each vehicle detector, individualized map information representing a distribution situation of the measurement quantities for each time slot in a given period of interest in the past, wherein the traffic situation determiner determines, based on the measurement quantities of the vehicle detector to be assessed in a most recent period and the individualized map information regarding the vehicle detector, whether the traffic situation related to the vehicle detector is abnormal.

According to this configuration, it is possible to determine whether the traffic situation related to the vehicle detector to be assessed is abnormal with high accuracy.

In the abnormality detection device according to an embodiment of the present invention, the traffic situation displayer displays, on a map image visualizing the individualized map information regarding the vehicle detector to be assessed, a screen in which the measurement quantities of the vehicle detector in the most recent period are plotted.

According to this configuration, by comparing the map image representing the distribution situation of the measurement quantities of the vehicle detector to be assessed for each time slot and the measurement quantities of the vehicle detector in the most recent period, the user can grasp the abnormality situation of the traffic situation represented by the measurement quantities of the vehicle detectors in detail.

An abnormality detection system according to an embodiment of the present invention detects an abnormality of vehicle detectors installed in a road network. The abnormality detection system comprises: a first device that, based on information obtained by the vehicle detectors, generates traffic information and controls traffic signals; and a second device provided additionally to the first device, wherein the first device comprises a detector information collector that collects detector information including measurement quantities from the vehicle detectors, and wherein the second device comprises: a map information generator that obtains the detector information from the first device, and generates, based on the measurement quantities of the vehicle detectors that already have been determined to be abnormal by a user, map information representing a distribution situation of the measurement quantities in an abnormal state; and a detector state determiner that determines, based on the measurement quantities of each vehicle detector to be assessed and the map information in the abnormal state, whether the vehicle detector is abnormal.

According to this configuration, no device for collecting information is required other than the vehicle detectors, while an abnormality of the vehicle detectors can be detected with high accuracy.

In the abnormality detection system according to an embodiment of the present invention, the second device further comprises: a traffic situation determiner that determines whether a traffic situation represented by the measurement quantities of the vehicle detectors that were not determined to be abnormal by the detector state determiner; and a traffic situation displayer that displays, on the display device, an abnormality of the traffic situation based on a determination result of the traffic situation determiner.

According to this configuration, it is possible to properly analyze the traffic situation based on the measurement quantities of the vehicle detectors and to present an abnormality of the traffic situation to the user with high accuracy.

A program according to an embodiment of the present invention causes a computer to execute a process of detecting an abnormality of vehicle detectors installed in a road network. The program causes the computer to: collect detector information including measurement quantities from the vehicle detectors; generate, based on the measurement quantities of the vehicle detectors that already have been determined to be abnormal by a user, map information representing a distribution situation of the measurement quantities in an abnormal state; and determine, based on the measurement quantities of each vehicle detector to be assessed and the map information in the abnormal state, whether the vehicle detector is abnormal.

According to this configuration, no device for collecting information is required other than the vehicle detectors, while an abnormality of the vehicle detectors can be detected with high accuracy The program according to an embodiment of the present invention causes the computer to: determine whether a traffic situation represented by the measurement quantities of the vehicle detectors that were not determined to be abnormal by the determining of whether the vehicle detector is abnormal is abnormal; and display, on a display device, an abnormality of the traffic situation based on a determination result of the determining of whether the traffic situation is abnormal.

According to this configuration, it is possible to properly analyze the traffic situation based on the measurement quantities of the vehicle detectors and to present an abnormality of the traffic situation to the user with high accuracy.

In the following, embodiments of the present invention will be described with reference to the drawings.

FIG. 1 is an overall configuration diagram of a traffic control center device 1 according to the present embodiment. This traffic control center device (abnormality detection device) 1 includes a first traffic management unit 11, a second traffic management unit 12, and a display device 14.

The first traffic management unit 11 realizes conventional functions related to traffic management, while the second traffic management unit 12 realizes novel functions related to traffic management. Such a configuration makes it possible to add new functions to the traffic control center device 1 without modifying the conventional configurational elements of the traffic control center device 1.

The first traffic management unit 11 receives, from the vehicle detectors 2, detector information including multiple measurement quantities (traffic volume, occupancy, abnormal pulse generation frequency, etc.) measured by each of the vehicle detectors 2 installed in a road network, and based on this detector information, executes a process of generating signal control information (cycle length, split, offset, etc.), such that traffic signals 3 are controlled based on the signal control information. Further, operation information regarding an actual operational situation of the traffic signals 3 is transmitted from the traffic signals 3 to the first traffic management unit 11, such that the first traffic management unit 11 can monitor the operational situation of the traffic signals 3 based on the operation information. It is to be noted that the signal control information explained in the following includes both command information to be transmitted to the traffic signals 3 and the operation information to be received from the traffic signals 3.

Further, the first traffic management unit 11 receives car number information from AVI (Automatic Vehicle Identification) terminals 5 and executes a process of generating traffic information such as travel time based on the car number information. In addition, the first traffic management unit 11 executes a process of providing traffic information to vehicle drivers or the like through a traffic information communication system, such as VICS (Vehicle Information and Communication System, registered trademark), that provides traffic information to drivers using optical beacons 4, etc.

The second traffic management unit 12 executes a process of detecting abnormalities of the vehicle detectors 2 and displaying them on the display device 14, and a process of analyzing the traffic situation and displaying it on the display device 14. This second traffic management unit 12 includes an input information management unit 20, a preprocessing unit 21, a categorizing unit 22, a statistical processing unit 23, a map information generating unit 24, a detector state determination unit 25, a traffic situation analysis unit 26, a detector state display unit 27, and a traffic situation display unit 28. The processes executed by these units of the second traffic management unit 12 will be explained in detail later.

It is to be noted that the various units in the traffic control center device 1 except for an information accumulation unit and an information storage unit are realized by executing a program for traffic management by a CPU provided to the traffic control center device 1 serving as an information processing device (computer).

Figure 2:
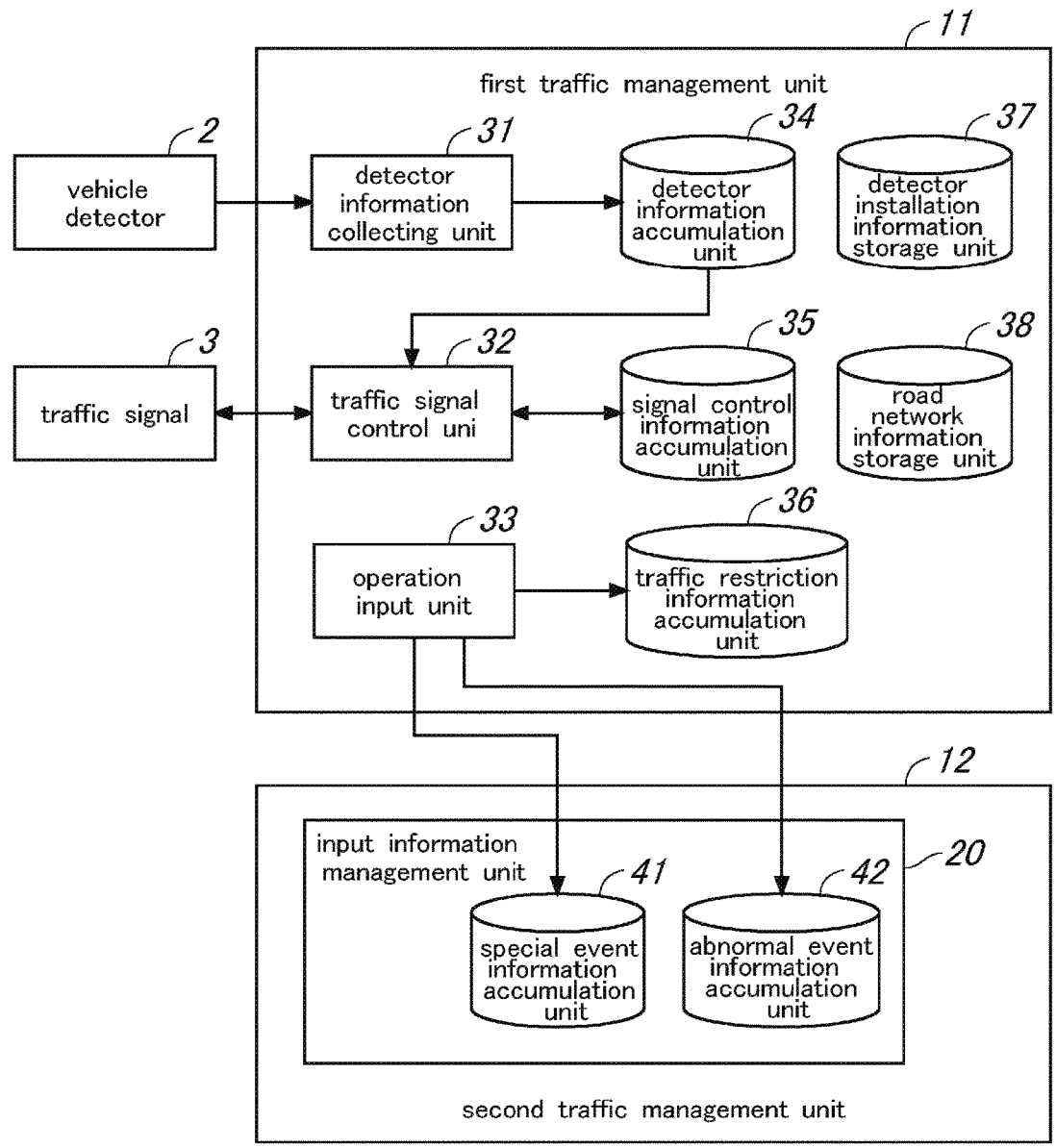
FIG. 2 is a functional block diagram for explaining the process executed by a first traffic management unit 11 and an input information management unit 20.

Next, description will be made of the process executed by the first traffic management unit 11 and the input information management unit 20. FIG. 2 is a functional block diagram for explaining the process executed by the first traffic management unit 11 and the input information management unit 20.

The first traffic management unit 11 includes a detector information collecting unit 31, a traffic signal control unit 32, an operation input unit 33, a detector information accumulation unit 34, a signal control information accumulation unit 35, a traffic restriction information accumulation unit 36, a detector installation information storage unit 37, and a road network information storage unit 38.

The detector information collecting unit 31 executes a process of collecting detector information including measurement quantities (traffic volume, occupancy, abnormal pulse generation frequency, etc.) from the vehicle detectors 2. The detector information collected by the detector information collecting unit 31 is accumulated in the detector information accumulation unit 34. Here, the traffic volume indicates the number of passing vehicles per unit time, the occupancy indicates the percent of time when some vehicle is passing the detector, and the abnormal pulse generation frequency indicates the number of generations of abnormal pulses, which have an excessively long or short pulse width, per unit time.

The traffic signal control unit 32 executes a process of generating signal control information (cycle length, split, offset, etc.) for controlling the traffic signals 3 based on the detector information accumulated in the detector information accumulation unit 34. The signal control information (command information) generated by this traffic signal control unit 32 is accumulated in the signal control information accumulation unit 35 together with the operation information received from the traffic signals 3. It is to be noted that, in the present embodiment, as the signal control information, information regarding the green time ratio of each traffic signal (the ratio of the green time assigned to the incoming road to the signal cycle length of each traffic signal installed at signal intersections) and the like is accumulated.

The detector installation information storage unit 37 stores detector installation information regarding the locations where the vehicle detectors 2 are installed. In the present embodiment, as the detector installation information, information regarding an installation distance relative to the signal intersection (distance from each vehicle detector 2 to the signal intersection having an incoming road consisting of the road where the vehicle detector 2 is installed), installation above a right turn only lane (whether each vehicle detector 2 is installed above a right turn only lane) and the like is stored.

The road network information storage unit 38 stores road network information regarding the nodes (intersections) constituting the road network and the mode of connection of the links (roads) that connect the nodes.

The operation input unit 33 executes a process of obtaining various information through operation of an input device, such as a keyboard, by the user. In the present embodiment, information such as that regarding the road(s) where a traffic restriction involving a lane restriction is in place is input by the user, and this information is accumulated in the traffic restriction information accumulation unit 36 as traffic restriction information.

The input information management unit 20 is configured to let the user input information that may become required by the second traffic management unit 12 through the operation input unit 33 and to manage the information, and includes a special event information accumulation unit 41 and an abnormal event information accumulation unit 42.

In the special event information accumulation unit 41 is accumulated special event information that relates to special events such as natural disaster (typhoon, heavy snowfall, etc.) or entertainment event. The special event information is information regarding the content of the event that occurred (such as the name of the natural disaster or entertainment event), the period in which the event occurred, the place where the event occurred (district code, link number, etc.) and the like. It is to be noted that the special event information and the traffic restriction information may overlap partly.

In the abnormal event information accumulation unit 42 is accumulated abnormal event information regarding the vehicle detectors 2 that already have been determined to be abnormal (having a malfunction or an operational abnormality) by the user (such as a traffic manager and a road manager). In each vehicle detector 2, a malfunction due to deterioration of a component element of the vehicle detector 2 or an abnormal operation due to obstruction of transmission and reception of the detection signal by growth of trees may occur, and such an abnormality of each vehicle detector 2 is detected by a division in charge of maintenance of the vehicle detectors 2 with a conventional technique and an appropriate measure such as repair is taken. At this time, information regarding the abnormality of the vehicle detectors 2 is collected and accumulated in the abnormal event information accumulation unit 42. It should be noted that the abnormal event information includes information regarding abnormality confirmation date and time, repair completion date and time, detector management number, details of repair, etc.

Figure 3:
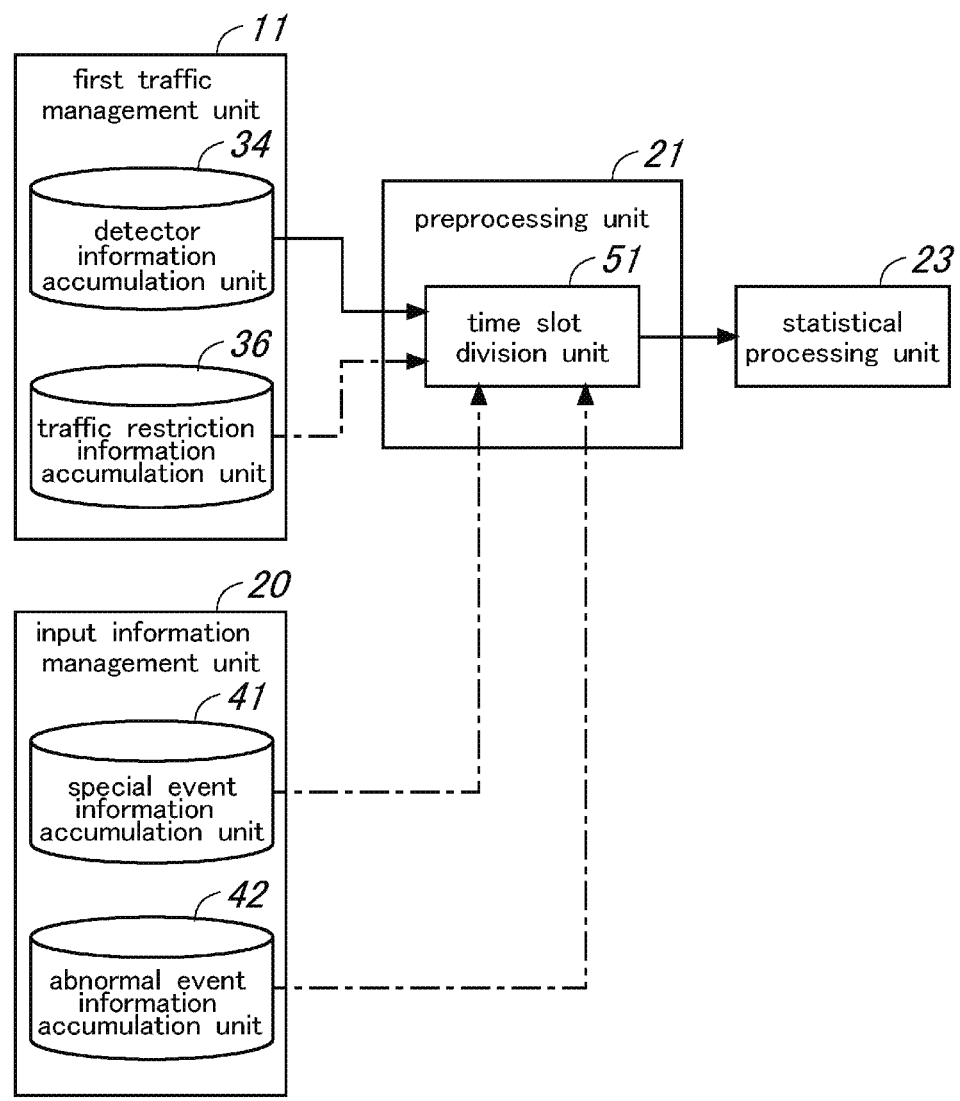
FIG. 3 is a functional block diagram for explaining the process executed by a preprocessing unit 21.

Next, description will be made of the processes executed by the units in the second traffic management unit 12 shown in FIG. 1. First, the process executed by the preprocessing unit 21 shown in FIG. 1 will be described. FIG. 3 is a functional block diagram for explaining the process executed by the preprocessing unit 21.

The preprocessing unit 21 includes a time slot division unit 51. This time slot division unit 51 executes a process of obtaining the measurement quantities (traffic volume, occupancy, and abnormal pulse generation frequency) of each vehicle detector 2 from the detector information accumulation unit 34, and based on the measurement quantities, dividing a day into multiple time slots such that in each time slot, the traffic situation does not change significantly. The time slots set here are to be used as aggregation periods in the statistical processing performed by the statistical processing unit 23, and time slot division information generated by the time slot division unit 51 (information indicating how a day is divided into multiple time slots) is sent to the statistical processing unit 23.

Further, the time slot division unit 51 may obtain the traffic restriction information from the traffic restriction information accumulation unit 36 and, if it is found based on this traffic restriction information that a traffic restriction involving a lane restriction has occurred on a certain road where a vehicle detector 2 is installed or on a road nearby, exclude the measurement quantities during the period when the traffic restriction is in place from the data to be processed. Furthermore, the time slot division unit 51 may be configured to make an appropriate correction to the measurement quantities during the period when the traffic restriction is in place to remove the influence of the traffic restriction, and then to add the corrected measurement quantities to the data to be processed.

In addition, the time slot division unit 51 may obtain the special event information from the special event information accumulation unit 41, and based on this special event information, exclude the measurement quantities during the period when a special event is occurring from the data to be processed. Also, the time slot division unit 51 may obtain the abnormal event information from the abnormal event information accumulation unit 42, and based on this abnormal event information, exclude the measurement quantities during the period when the abnormal event is occurring from the data to be processed.

Further, in addition to the time slot division process, the preprocessing unit 21 executes a basic data cleansing process. In this process, a traffic volume for each time slot is calculated, and the measurement quantities for each day constituting the upper and lower 10 percent in the time slot where the traffic volume reaches its peak, for example, in the time slot where the traffic volume becomes the maximum in the morning or evening, are removed from the data to be processed. Further, the data for each day that includes a time slot in which the measurement quantities exhibit apparently large values compared to the standard deviation is removed.

In the present embodiment, a day is divided into time slots based on the measurement quantities of the vehicle detectors 2, but it is also possible to preset the time slots.

Figure 4:
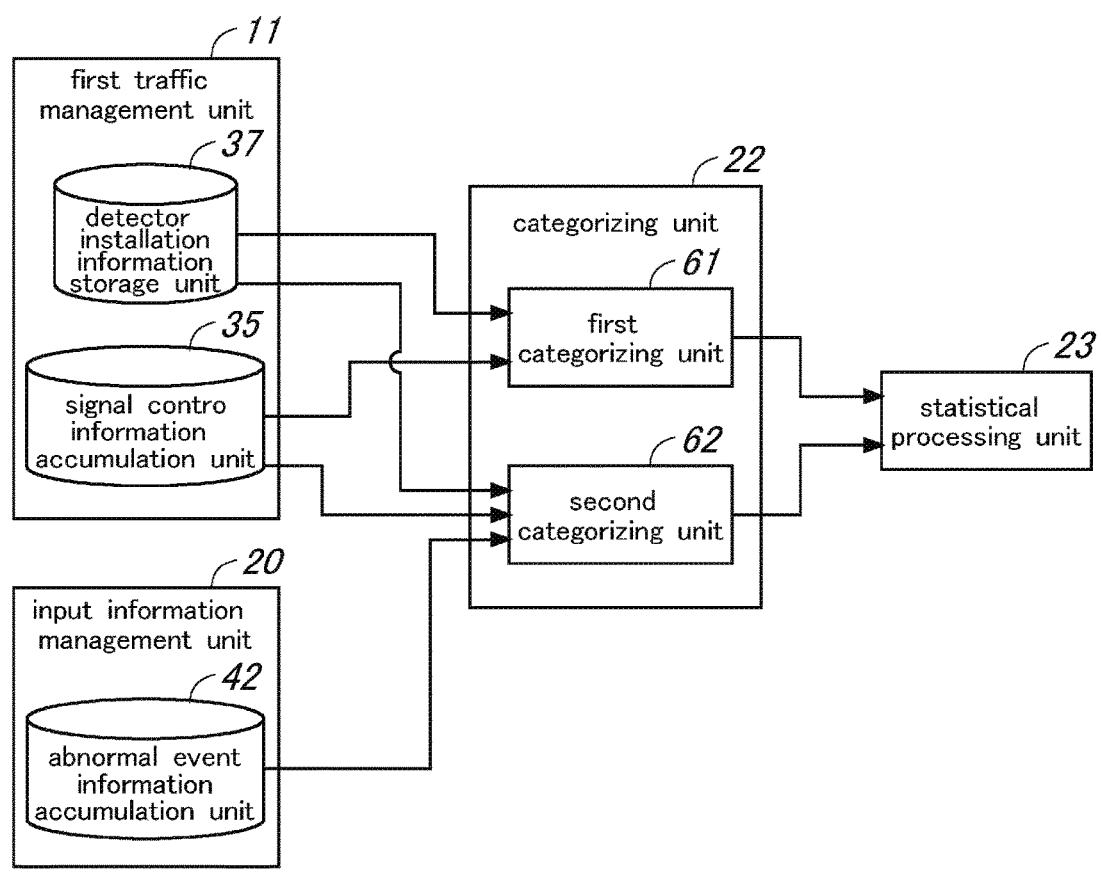
FIG. 4 is a functional block diagram for explaining the process executed by a categorizing unit 22.

Next, description will be made of the process executed by the categorizing unit 22 shown in FIG. 1. FIG. 4 is a functional block diagram for explaining the process executed by the categorizing unit 22. FIG. 5 is an explanatory diagram illustrating an example of categorization conditions used by the categorizing unit 22.

As shown in FIG. 4, the categorizing unit 22 includes a first categorizing unit 61 and a second categorizing unit 62.

In a general road, in addition to the geometric structure of the road, a condition of the installation point of each vehicle detector 2, namely, the installation distance relative to the signal intersection (distance from the vehicle detector 2 to the signal intersection having an incoming road consisting of the road where the vehicle detector 2 is installed) and whether the vehicle detector 2 is installed above a right turn only lane, as well as a condition relevant to the effect of smoothing the traffic, namely, the green time ratio of the traffic signal (the ratio of green time assigned to the incoming road to the signal cycle length of the traffic signal installed at the signal intersection), have a large influence on the traffic flow at the installation point of the vehicle detector 2, and depending on these conditions, the measurement quantities of the vehicle detector 2, particularly the relationship between measurement quantities (for example, relationship between the traffic volume and the occupancy) may vary significantly. Therefore, in the present embodiment, a process of categorizing the vehicle detectors 2, namely, classifying the vehicle detectors 2 into a plurality of categories (groups) in accordance with prescribed categorization conditions regarding the factors having an influence on the traffic situation at the installation point of each vehicle detector 2 is performed by the first categorizing unit 61.

Namely, the first categorizing unit 61 executes a process of: obtaining the detector installation information from the detector installation information storage unit 37; obtaining the signal control information from the signal control information accumulation unit 35; and, based on these pieces of information, categorizing each of the vehicle detectors 2. In this process, each vehicle detector 2 is categorized in accordance with a first set of categorization conditions regarding the factors that affect the traffic situation at the installation point of each vehicle detector 2 (the installation point of the vehicle detector 2 and the green time ratio of the traffic signal), such that the vehicle detectors 2 having similar installation point situations are grouped into one category.

FIG. 5 (A) shows an example of the first set of categorization conditions. In this example, as the factors having an influence on the traffic situation at the installation point of each vehicle detector 2, two parameters; namely, the installation point of the vehicle detector 2 (the installation distance relative to the signal intersection and whether the detector is installed above a right turn only lane) and the green time ratio of the traffic signal, are used to set the first set of categorization conditions. Further, in the example shown in FIG. 5 (A), each parameter is divided into five levels, such that 25 (5×5) categories are set in total. It is to be noted that a congestion occurrence frequency or the like may be added as a parameter.

Further, with regard to the vehicle detectors 2 that already have been determined to be abnormal (malfunction and operational abnormality) by the user (such as a traffic manager and a road manager), the causes of abnormalities of the vehicle detectors 2 have a big influence on the measurement quantities of the vehicle detectors 2, and the measurement quantities of the vehicle detectors 2 vary significantly depending on the abnormality causes. Therefore, in the present embodiment, a process of adding the abnormality causes to the categorization conditions besides the factors having an influence on the traffic situation at the installation points of the vehicle detectors 2 and categorizing the vehicle detectors 2 is executed by the second categorizing unit 62.

Namely, the second categorizing unit 62 executes a process of obtaining, in addition to the detector installation information from the detector installation information storage unit 37 and the signal control information from the signal control information accumulation unit 35, the abnormal event information from the abnormal event information accumulation unit 42, and, based on these pieces of information, categorizing each vehicle detector 2. In this process, the vehicle detectors 2 that already have been determined to be abnormal (malfunction and operational abnormality) by the user (such as a traffic manager and a road manager) are categorized according to a second set of categorization conditions regarding the factors having an influence on the traffic situation at the installation point of each vehicle detector 2 (installation point of the vehicle detector 2 and the green time ratio of the traffic signal) and the abnormality causes of the vehicle detectors 2, whereby the vehicle detectors 2 with regard to which the installation point situations, green time ratios of the traffic signals, and abnormality causes are similar are grouped into one category.

FIG. 5 (B) shows an example of the second set of categorization conditions. While the first set of categorization conditions FIG. 5 (A) is described by a two-dimensional table based on the two parameters; namely, the installation point of the vehicle detector 2 and the green time ratio of the traffic signal, the second set of categorization conditions FIG. 5 (B) has the abnormality cause added as a third parameter, such that the table based on the installation point of the vehicle detector 2 and the green time ratio of the traffic signal is set for each of the different abnormality causes. In the example shown in FIG. 5 (B), the malfunction due to deterioration or the like of a component element of the vehicle detector 2 and the abnormal operation due to an obstruction of transmission and reception of the detection signal by the growth of trees are referred to as abnormality causes A and B, respectively, and each category is further classified based on these two abnormality causes A and B, whereby 50 (5×5×2) categories are set in total. It is to be noted that three or more abnormality causes may be set, and in this case, tables for the respective abnormality causes are set in accordance with the number of abnormality causes.

Figure 6:
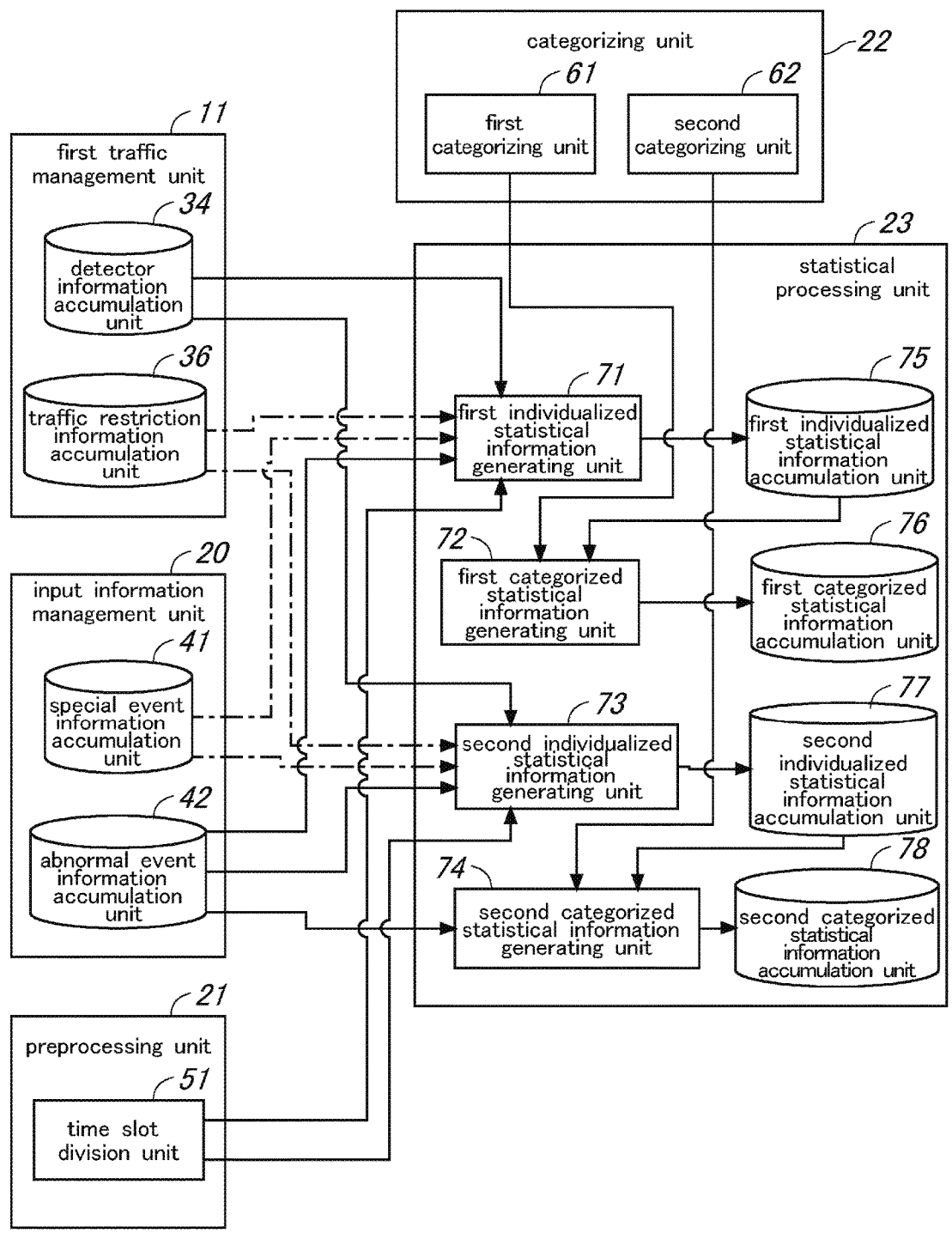
FIG. 6 is a functional block diagram for explaining the process executed by a statistical processing unit 23.

Next, description will be made of the process executed by the statistical processing unit 23 shown in FIG. 1. FIG. 6 is a functional block diagram for explaining the process executed by the statistical processing unit 23.

The statistical processing unit 23 includes a first individualized statistical information generating unit 71, a first categorized statistical information generating unit 72, a second individualized statistical information generating unit 73, a second categorized statistical information generating unit 74, a first individualized statistical information accumulation unit 75, a first categorized statistical information accumulation unit 76, a second individualized statistical information accumulation unit 77, and a second categorized statistical information accumulation unit 78.

The first individualized statistical information generating unit 71 executes a process of: obtaining the measurement quantities of each vehicle detector 2 from the detector information accumulation unit 34; obtaining the abnormal event information from the abnormal event information accumulation unit 42; obtaining the time slot division information from the time slot division unit 51; and based on these pieces of information, statistically processing, for each time slot, the measurement quantities of each of the vehicle detectors 2 that have not been determined to be abnormal by the user (such as a traffic manager and a road manager), namely, the vehicle detectors 2 that are assumed to be operating normally, to thereby generate statistical information (first individualized statistical information) that includes statistical values of the measurement quantities of each of these vehicle detectors 2 for each time slot.

Here, the measurement quantities include the traffic volume, occupancy, and abnormal pulse generation frequency, and the first individualized statistical information generating unit 71 executes a process of calculating an average and a standard deviation of each of the traffic volume, occupancy, and abnormal pulse generation frequency for each time slot.

Also, the first individualized statistical information generating unit 71 may obtain the special event information from the special event information accumulation unit 41, and based on this special event information, exclude the measurement quantities during the period when a special event is occurring from the data to be processed.

Further, the first individualized statistical information generating unit 71 may obtain the traffic restriction information from the traffic restriction information accumulation unit 36, and based on this traffic restriction information, exclude the measurement quantities during a period when a traffic restriction involving a lane restriction is in place on a road where a vehicle detector 2 is installed or a road nearby from the data to be processed. Furthermore, the first individualized statistical information generating unit 71 may be configured to make an appropriate correction to the measurement quantities during the period when the traffic restriction is in place to remove the influence of the traffic restriction, and then to add the corrected measurement quantities to the data to be processed.

The first categorized statistical information generating unit 72 executes a process of: obtaining the first individualized statistical information from the first individualized statistical information accumulation unit 75; obtaining first detector category information (information regarding the category of each vehicle detector 2) from the first categorizing unit 61; and unifying, for each category, pieces of first individualized statistical information generated for the respective normal vehicle detectors 2 to thereby generate statistical information for each category (first categorized statistical information). This process is performed for each category according to the first set of categorization conditions (refer to FIG. 5 (A)), whereby the pieces of statistical information regarding the vehicle detectors 2 having similar conditions regarding the factors having an influence on the traffic situation at the installation points of the vehicle detectors 2 are integrated into one.

It is to be noted that the first categorized statistical information generating unit 72 may generate the first categorized statistical information from only the pieces of first individualized statistical information regarding the vehicle detectors 2 in which the traffic situation is characteristically represented.

The second individualized statistical information generating unit 73 executes a process of: obtaining the measurement quantities of each vehicle detector 2 from the detector information accumulation unit 34; obtaining the abnormal event information from the abnormal event information accumulation unit 42; obtaining the time slot division information from the time slot division unit 51; and based on these pieces of information, statistically processing, for each time slot, the measurement quantities of each of the vehicle detectors 2 that already have been determined to be abnormal (malfunction and operational abnormality) by the user (such as a traffic manager and a road manager), to thereby generate statistical information (second individualized statistical information) that includes statistical values of the measurement quantities of each of these vehicle detectors 2 for each time slot.

Here, the measurement quantities include the traffic volume, occupancy, and abnormal pulse generation frequency, and the second individualized statistical information generating unit 73 executes a process of calculating an average and a standard deviation of each of the traffic volume, occupancy, and abnormal pulse generation frequency for each time slot, similarly to the first individualized statistical information generating unit 71. Further, the second individualized statistical information generating unit 73 obtains the measurement quantities regarding the vehicle detectors 2 that already have been determined to be abnormal, and at this time, the second individualized statistical information generating unit 73 may also obtain the measurement quantities during a predetermined period (a few days, for example) before the determination of abnormality in addition to those during a period after the determination of abnormality, and generate the second individualized statistical information accordingly.

Further, similarly to the first individualized statistical information generating unit 71, the second individualized statistical information generating unit 73 may obtain the special event information from the special event information accumulation unit 41, and based on this special event information, exclude the measurement quantities during the period when a special event is occurring from the data to be processed. Furthermore, similarly to the first individualized statistical information generating unit 71, the second individualized statistical information generating unit 73 may obtain the traffic restriction information from the traffic restriction information accumulation unit 36, and based on this traffic restriction information, exclude the measurement quantities during the period when the traffic restriction is occurring from the data to be processed, and/or make an appropriate correction to the measurement quantities to remove the influence of the traffic restriction.

The second categorized statistical information generating unit 74 executes a process of: obtaining the second individualized statistical information from the second individualized statistical information accumulation unit 77; obtaining second detector category information (information regarding the category of each vehicle detector 2) from the second categorizing unit 62; and unifying, for each category, pieces of second individualized statistical information generated for the respective abnormal vehicle detectors 2, to thereby generate statistical information for each category (second categorized statistical information). This process is performed for each category according to the second set of categorization conditions (refer to FIG. 5 (B)), whereby the pieces of statistical information regarding the vehicle detectors 2 having similar conditions regarding the factors having an influence on the traffic situation at the installation points of the vehicle detectors 2 and having the same abnormality cause are integrated into one.

Figure 7:
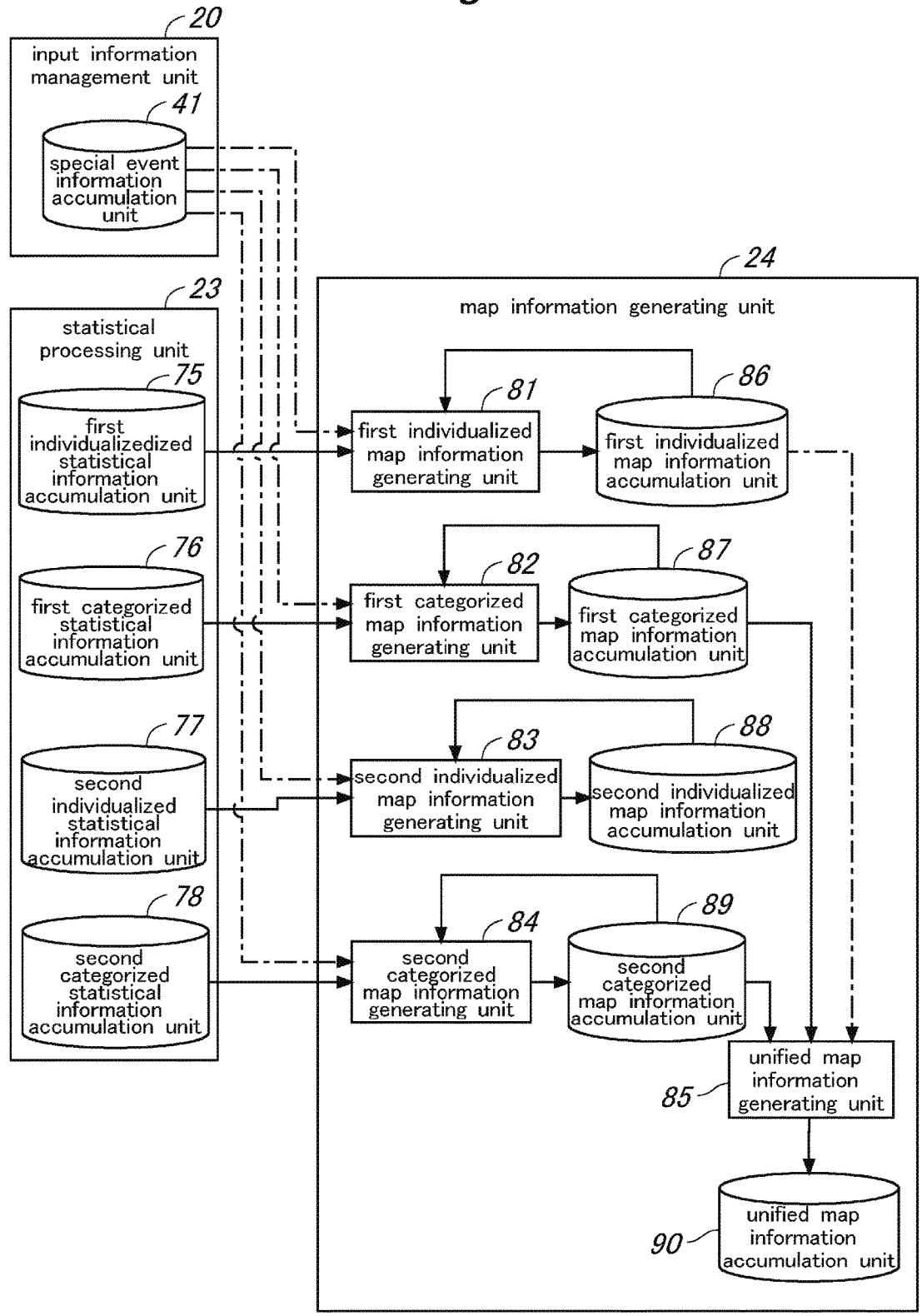
FIG. 7 is a functional block diagram schematically showing the configuration of a map information generating unit 24.
Figure 8:
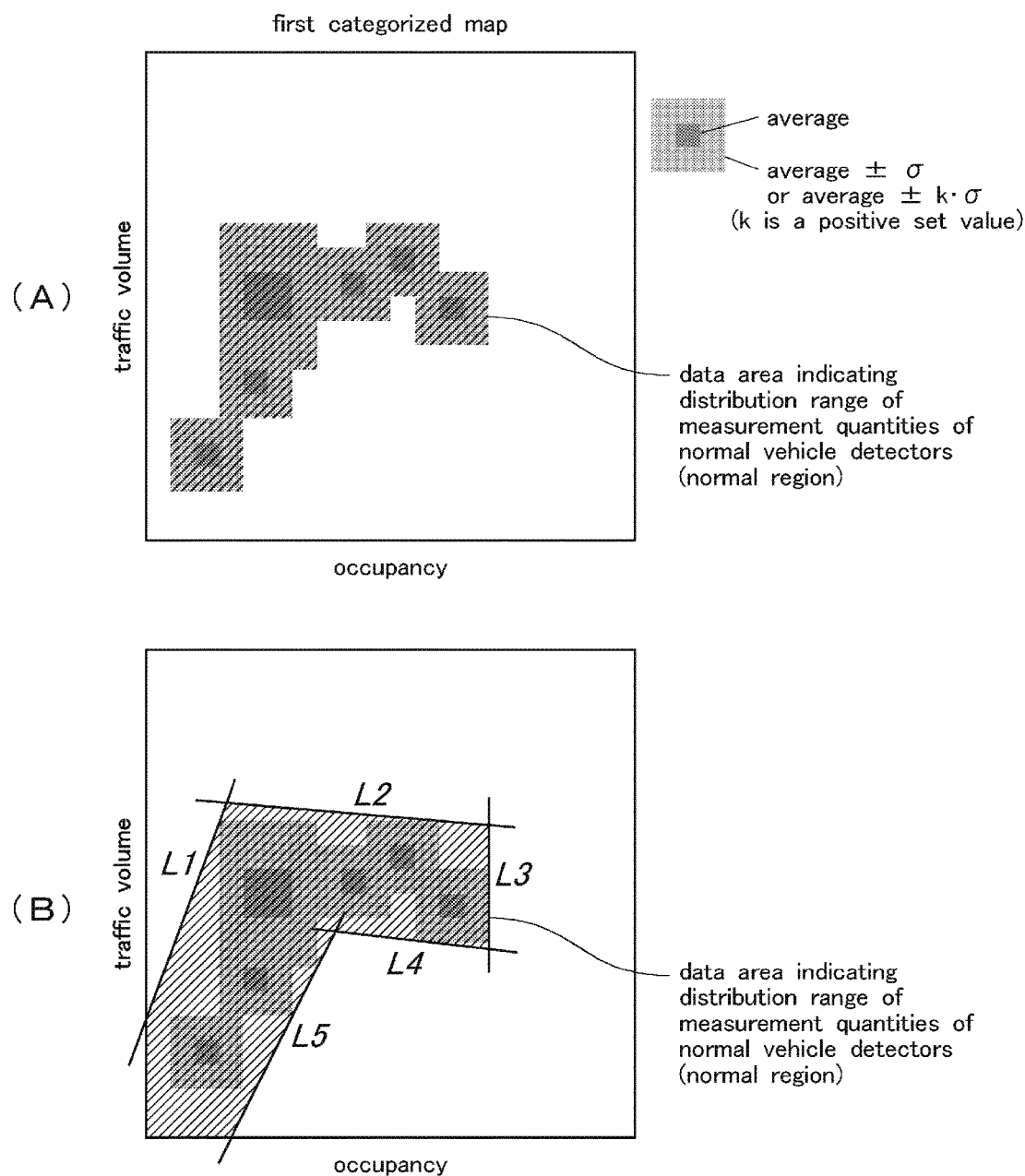
FIG. 8 is an explanatory diagram illustrating in (A) and (B) a first categorized map visualizing first categorized map information generated by a first categorized map information generating unit 82.
Figure 10:
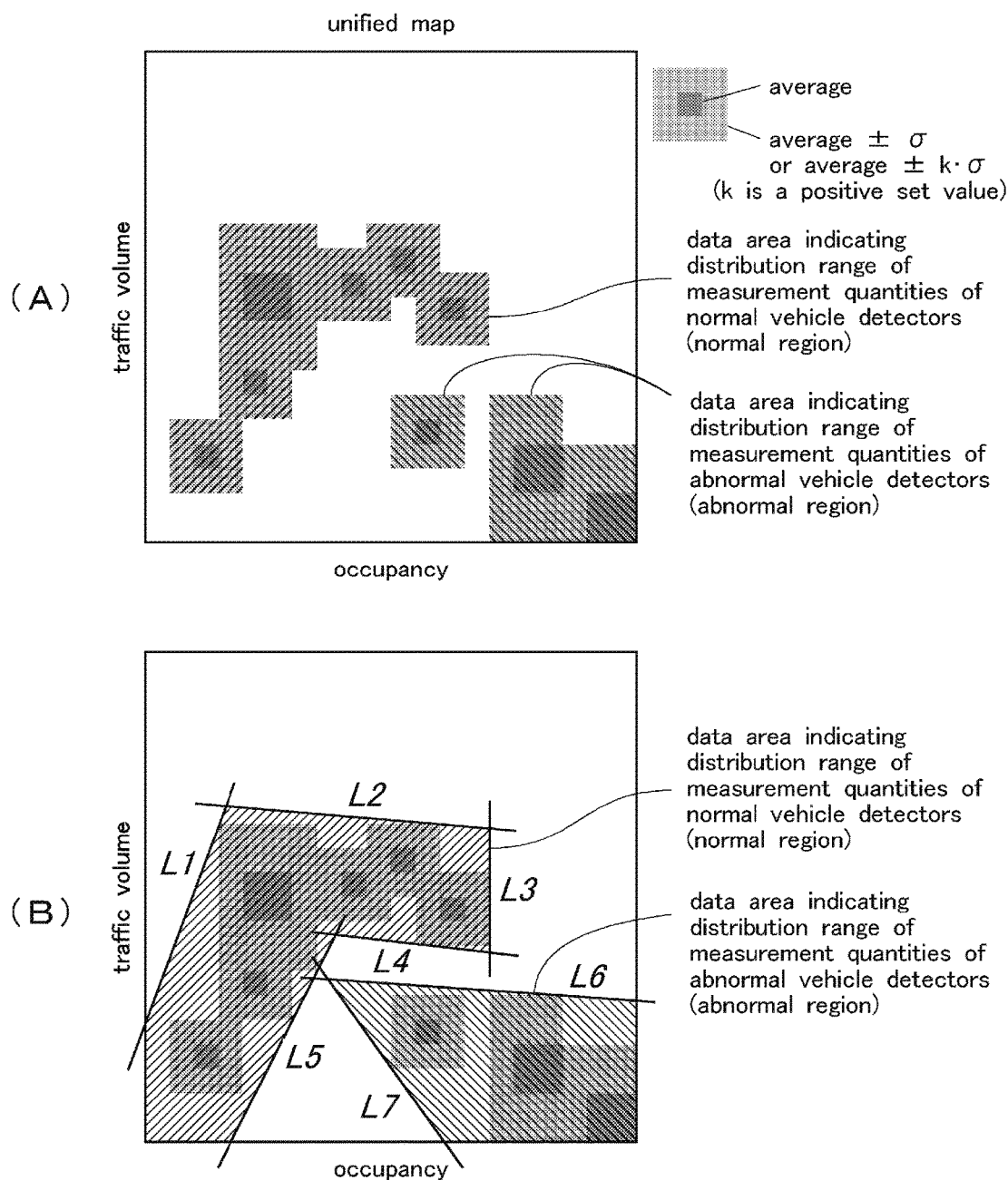
FIG. 10 is an explanatory diagram illustrating in (A) and (B) a unified map visualizing the unified map information generated by a unified map information generating unit 85.

Next, description will be made of the process executed by the map information generating unit 24 shown in FIG. 1. FIG. 7 is a functional block diagram schematically showing the configuration of the map information generating unit 24. FIG. 8 is an explanatory diagram illustrating a first categorized map visualizing first categorized map information generated by a first categorized map information generating unit 82. FIG. 9 is an explanatory diagram illustrating a second categorized map visualizing second categorized map information generated by a second categorized map information generating unit 84. FIG. 10 is an explanatory diagram illustrating a unified map visualizing unified map information generated by a unified map information generating unit 85.

As shown in FIG. 7, the map information generating unit 24 includes a first individualized map information generating unit 81, a first categorized map information generating unit 82, a second individualized map information generating unit 83, a second categorized map information generating unit 84, a unified map information generating unit 85, a first individualized map information accumulation unit 86, a first categorized map information accumulation unit 87, a second individualized map information accumulation unit 88, a second categorized map information accumulation unit 89, and a unified map information accumulation unit 90.

Each of the map information generating units 81 to 84 executes a process of updating map information generated by a previous process, by use of statistical information generated anew by the statistical processing unit 23. Namely, the statistical processing unit 23 generates statistical information for each predetermined period (for example, one month or one day), and each of the map information generating units 81 to 84 executes, each time statistical information for a predetermined period is generated by the statistical processing unit 23, a process of updating the map information accumulated in the corresponding one of the map information accumulation units 86 to 89 by use of the statistical information. When executing the process first time, each of the map information generating units 81 to 84 may update initial information defining the data structure of each map information.

The first individualized map information generating unit 81 executes a process of: obtaining, from the first individualized statistical information accumulation unit 75, the first individualized statistical information regarding each vehicle detector 2, namely, the statistical values of the measurement quantities (average and standard deviation of each of the traffic volume and the occupancy for each time slot) of each vehicle detector 2, for a predetermined period; and based on this first individualized statistical information, generating, for each of the vehicle detectors 2, first individualized map information representing the distribution situation (existence range) of the statistical values of the measurement quantities of the vehicle detector 2. The first individualized statistical information is generated from the measurement quantities of the vehicle detectors 2 in the normal state, and each piece of first individualized map information represents the distribution range of the measurement quantities of the corresponding vehicle detector 2 in the normal state.

The first categorized map information generating unit 82 executes a process of: obtaining, from the first categorized statistical information accumulation unit 76, the first categorized statistical information regarding each category, namely, the statistical values of the measurement quantities of the vehicle detectors 2 belonging each category, for a predetermined period; and based on this first categorized statistical information, generating, for each category, first categorized map information representing the distribution situation (existence range) of the statistical values of the measurement quantities for each category. The first categorized statistical information is generated from the measurement quantities of the vehicle detectors 2 in the normal state, and each piece of first categorized map information represents the distribution range of the measurement quantities of the vehicle detectors 2 belonging to the corresponding category when these detectors 2 are in the normal state.

The second individualized map information generating unit 83 executes a process of: obtaining, from the second individualized statistical information accumulation unit 77, the second individualized statistical information regarding each vehicle detector 2, namely, the statistical values of the measurement quantities (average and standard deviation of each of the traffic volume and the occupancy for each time slot) of each vehicle detector 2, for a predetermined period; and based on this second individualized statistical information, generating, for each of the vehicle detectors 2, second individualized map information representing the distribution situation (existence range) of the statistical values of the measurement quantities of the vehicle detector 2. The second individualized statistical information is generated from the measurement quantities of the vehicle detectors 2 in the abnormal state, and each piece of second individualized map information represents the distribution range of the measurement quantities of the corresponding vehicle detector 2 in the abnormal state.

The second categorized map information generating unit 84 executes a process of: obtaining, from the second categorized statistical information accumulation unit 78, the second categorized statistical information regarding each category, namely, the statistical values of the measurement quantities of the vehicle detectors 2 belonging to each category, for a predetermined period; and based on this second categorized statistical information, generating, for each category, second categorized map information representing the distribution situation (existence range) of the statistical values of the measurement quantities for each category. The second categorized statistical information is generated from the measurement quantities of the vehicle detectors 2 in the abnormal state, and each piece of second categorized map information represents the distribution range of the measurement quantities of the vehicle detectors 2 belonging to the corresponding category when these detectors 2 are in the abnormal state.

Further, each of the map information generating units 81 to 84 may obtain the special event information from the special event information accumulation unit 41, and based on this special event information, exclude the statistical information during the period when a special event such as a natural disaster or an entertainment event occurred from the data to be processed.

By visualizing the first categorized map information generated by the first categorized map information generating unit 82, a first categorized map shown in FIG. 8 (A) is obtained. In this first categorized map, a data area representing the distribution range (existence range) of each statistical value (average and standard deviation) of the measurement quantities (traffic volume and occupancy) for a predetermined period is defined, and this data area indicates the range (normal region) of values that can be taken by the measurement quantities (traffic volume and occupancy) of the vehicle detectors 2 belonging to the concerned category when these vehicle detectors 2 are operating normally.

In the example shown in FIG. 8 (A), the vertical and horizontal axes represent the traffic volume and occupancy, respectively, and the data area is constituted of a set of ranges each defined by the respective standard deviation of the traffic volume and occupancy with the respective average of the traffic volume and occupancy being at the center thereof. Specifically, the data area is constituted of a set of ranges each defined by the respective average±σ (standard deviation) or the respective average±k·σ of the traffic volume and occupancy, where k is a positive set value greater than or equal to 1 (for example, 2) and this also applies to the following description.

As illustrated in FIG. 8 (B), it is also possible to set a plurality of line segments representing the boundary of the data area, such that the plurality of line segments define the data area. In the example shown in FIG. 8 (B), the data area is defined by five line segments L1 to L5. It is to be noted that though the line segments for representing the boundary of the data area may be input by the user after visually confirming the first categorized map shown in FIG. 8 (A), the line segments may also be generated by the first categorized map information generating unit 82. In this case, the second categorized map information contains information regarding the line segments representing the boundary of the data area and the position of the data area relative to the line segments.

It is also to be noted that the map information of the present embodiment can be constituted of a two-dimensional array data representing each of the traffic volume and occupancy in a discrete manner from zero to the upper limits, wherein each element of the array is assigned information indicating presence/absence of data of an average of the measurement quantities (traffic volume and occupancy), information indicating presence/absence of data of an average±σ (standard deviation) or an average ±k·σ, and information indicating the data acquisition date, and so forth. The traffic volume may be represented in a discrete manner with a minimum unit of one, for example, and the occupancy may be represented in a discrete manner with a minimum unit of 1%, for example.

By visualizing the second categorized map information generated by the second categorized map information generating unit 84 shown in FIG. 7, a second categorized map shown in FIG. 9 (A) is obtained. In this second categorized map, a data area representing the distribution range (existence range) of each statistical value (average and standard deviation) of the traffic volume and occupancy is defined, and this data area indicates the range (abnormal region) of the values that can be taken by the measurement quantities (traffic volume and occupancy) of the vehicle detectors 2 belonging to the concerned category when these vehicle detectors 2 are abnormal (malfunction and operational abnormality).

In this second categorized map, similarly to the first categorized map shown in FIG. 8 (A), the vertical and horizontal axes represent the traffic volume and occupancy, respectively, and the data area is constituted of a set of ranges each defined by the respective standard deviation of the traffic volume and occupancy with the respective average of the traffic volume and occupancy being at the center thereof.

Further, as illustrated in FIG. 9 (B), it is possible to set a plurality of line segments representing the boundary of the data area, such that the plurality of line segments define the data area. In the example shown in FIG. 9 (B), the data area is defined by two line segments L6, L7. In this case, the second categorized map information contains information regarding the line segments representing the boundary of the data area and the position of the data area relative to the line segments.

It is to be noted that, in the present embodiment, a first individualized map and a second individualized map that visualizes the information generated by the first individualized map information generating unit 81 and the second individualized map information generating unit 83, respectively, are not specifically shown in the drawings, but it should be understood that the first individualized map is similar to the first categorized map shown in FIG. 8, while the second individualized map is similar to the second categorized map shown in FIG. 9.

The unified map information generating unit 85 shown in FIG. 7 executes a process of obtaining the first categorized map information and the second categorized map information from the first categorized map information accumulation unit 87 and the second categorized map information accumulation unit 89, respectively, and unifying the first categorized map information and the second categorized map information for each vehicle detector 2, to thereby generate unified map information for each vehicle detector 2. It is also possible to generate unified map information for each category.

By visualizing this unified map information, a unified map as illustrated in FIG. 10 (A) is obtained. In this unified map, the data area in the first categorized map shown in FIG. 8 (A), namely, the range (normal region) of values that can be taken by the measurement quantities of the vehicle detectors 2 operating normally, and the data area in the second categorized map shown in FIG. 9 (A), namely, the range (abnormal region) of values taken by the measurement quantities of the abnormal vehicle detectors 2, are defined together.

In the case, a plurality of line segments representing the boundaries of the data areas are set in the first categorized map and the second categorized map, as was illustrated in FIG. 8 (B) and FIG. 9 (B), respectively, to define the data areas with these line segments, the unified map will be as illustrated in FIG. 10 (B).

It is to be noted that the first categorized map information is generated for each of the categories divided based on the installation points of the vehicle detectors 2 and the green time ratios of the traffic signals in accordance with the first set of categorization conditions shown in FIG. 5 (A), while the second categorized map information is generated for each of the categories divided based on the abnormality causes of the vehicle detectors 2 in addition to the installation points of the vehicle detectors 2 and the green time ratios of the traffic signals in accordance with the second set of categorization conditions shown in FIG. 5 (B), and thus, when unifying the first categorized map information and the second categorized map information, the second categorized map information should be consolidated so as to correspond to the categories according to the first set of categorization conditions similarly to the first categorized map information, before the first categorized map information and the second categorized map information are unified.

It is also possible to generate unified map information for each of the categories defined according to the second set of categorization conditions. Further, it is possible to set abnormal regions for respective abnormality causes in the unified map information, namely, the unified map information may contain information regarding the abnormal regions for the respective abnormality causes.

Yet further, the unified map information generating unit 85 may unify the first individualized map information to the unified map information generated for each category, to thereby generate the unified map information for each vehicle detector 2. In this case, because the first individualized map information is based on the measurement quantities of the vehicle detectors 2 that are assumed to be operating normally, the unifying of the first individualized map information to the unified map information results in the data area defined in the first individualized map information overlapping the data area representing the normal region in the unified map information.

It is to be noted that in the present embodiment, each of the first individualized map information, first categorized map information, second individualized map information, second categorized map information, and unified map information is generated based on the combination of the traffic volume and occupancy, but it may be based on the combination of the traffic volume and abnormal pulse generation frequency or based on the combination of the occupancy and abnormal pulse generation frequency.

Also, though FIG. 8 to FIG. 10 show the first categorized map, the second categorized map, and the unified map, respectively, these maps were illustrated visually for the convenience of explaining the process related to the map information, and these maps are not actually depicted by the first categorized map information generating unit 82, the second categorized map information generating unit 84, and the unified map information generating unit 85.

Figure 11:
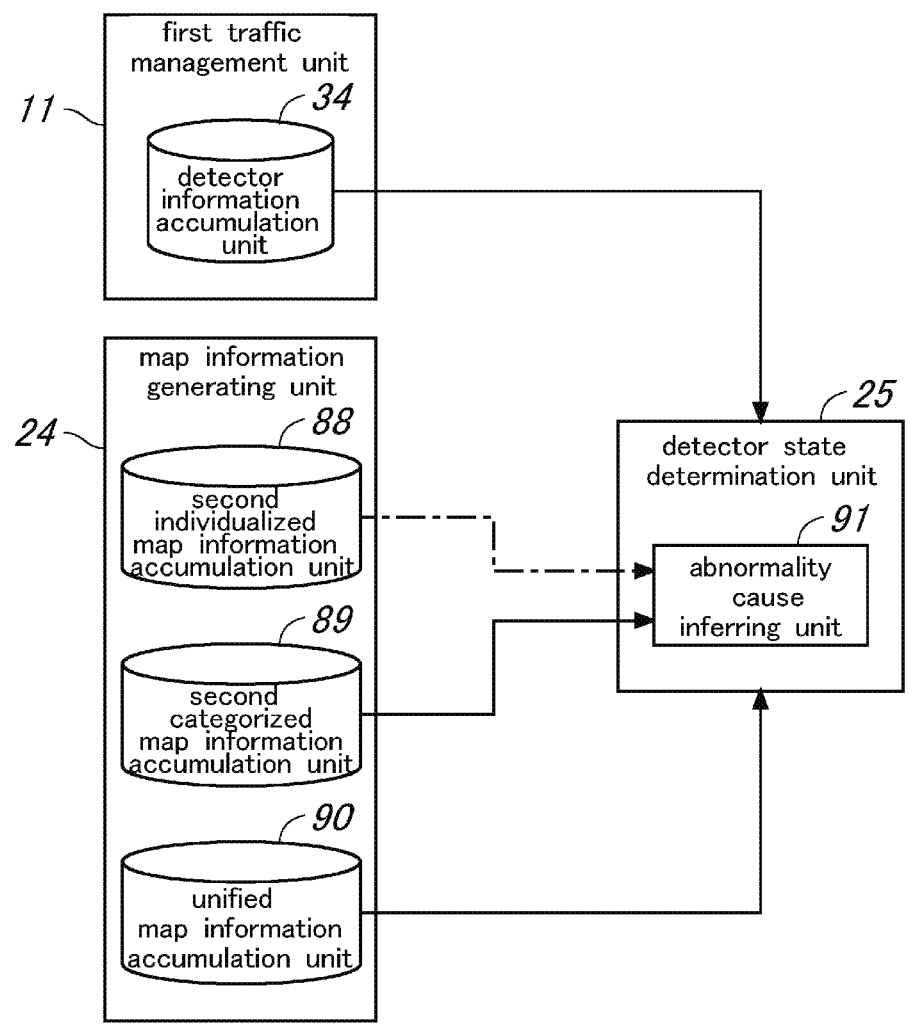
FIG. 11 is a functional block diagram for explaining the process executed by a detector state determination unit 25.
Figure 12:
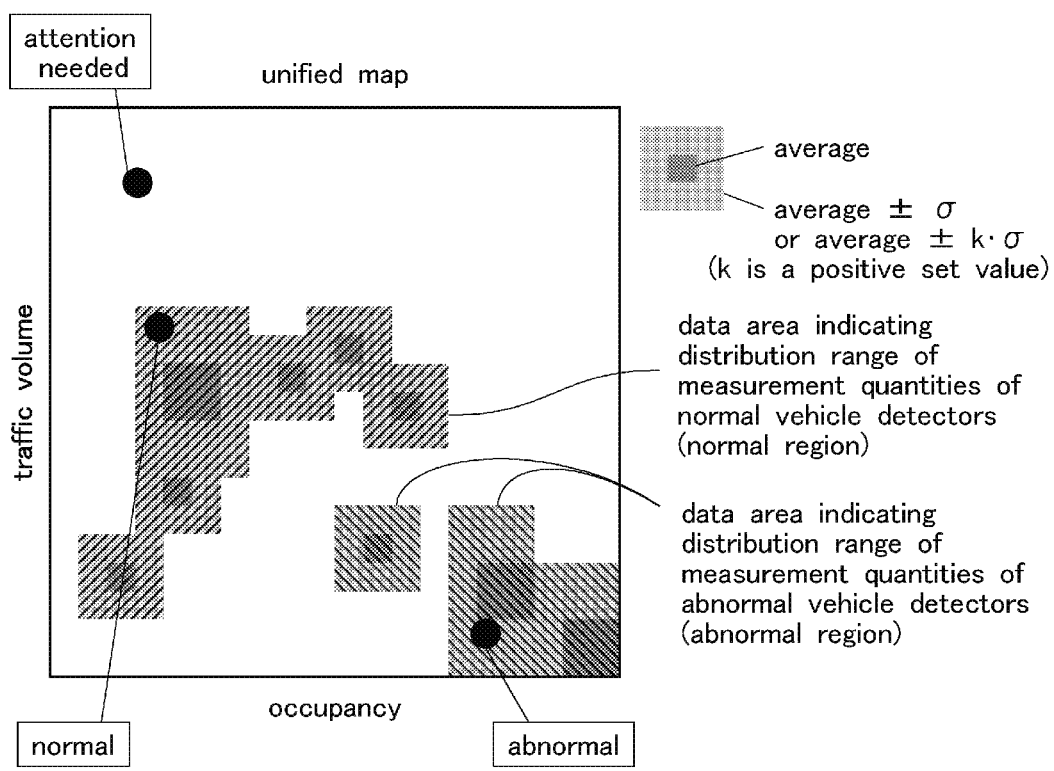
FIG. 12 is an explanatory diagram for explaining the process executed by the detector state determination unit 25.

Next, description will be made of the process executed by the detector state determination unit 25 shown in FIG. 1. FIG. 11 is a functional block diagram for explaining the process executed by the detector state determination unit 25. FIG. 12 is an explanatory diagram for explaining the process executed by the detector state determination unit 25.

As shown in FIG. 11, the detector state determination unit 25 executes a process of: obtaining the unified map information regarding each vehicle detector 2 to be assessed from the unified map information accumulation unit 90; obtaining the measurement quantities of the vehicle detector 2 in the most recent period (such as one day, for example) from the detector information accumulation unit 34; and based on these pieces of information, determining whether the vehicle detector 2 is abnormal. In this process, the measurement quantities of the vehicle detector 2 to be assessed in the most recent period (such as one day, for example) are compared with the unified map information to determine whether the vehicle detector 2 is abnormal.

FIG. 12 visually shows the process executed by the detector state determination unit 25. In the unified map, the data area indicating the distribution range of the measurement quantities of the vehicle detectors 2 operating normally (normal region) and the data area indicating the distribution range of the measurement quantities of the abnormal vehicle detectors 2 (abnormal region) are defined together, and if the measurement quantities (traffic volume and occupancy) of the vehicle detector 2 to be assessed are within the abnormal region, it is determined that the detector 2 is "abnormal," and if within the normal region, it is determined that the detector 2 is "normal." Further, if the measurement quantities of the vehicle detector 2 to be assessed do not fall in the abnormal region nor the normal region, it is determined that "attention is required." In addition, there may be a case where the abnormal region and the normal region overlap each other, and in such a case, if the data of the vehicle detector 2 falls in the overlapping region, it is determined that "attention is required." In the case where the abnormal region and the normal region are defined by a plurality of line segments (refer to FIG. 10 (B)), the determination is made with reference to the line segments.

It is to be noted that though in the present embodiment, the state of the vehicle detector 2 is determined by use of the unified map information, it is also possible to make the determination by use of the second categorized map information instead of the unified map information. In this case, the determination of whether the vehicle detector 2 is abnormal can be made.

Also, as shown in FIG. 11, the detector state determination unit 25 includes an abnormality cause inferring unit 91. This abnormality cause inferring unit 91 executes a process of: obtaining, from the detector information accumulation unit 34, the measurement quantities of the vehicle detector 2 to be assessed, namely, each of the vehicle detectors 2 determined to be abnormal by the detector state determination unit 25, in the most recent period; obtaining, from the second categorized map information accumulation unit 89, the second categorized map information regarding each category; and based on these pieces of information, inferring the abnormality cause of the vehicle detector 2 to be assessed.

It is to be noted here that the distribution situation of the statistical values of the measurement quantities represented by the data area in the second categorized map information varies depending on the abnormality causes, and a vehicle detector 2 whose abnormality cause matches the abnormality cause related to a certain piece of second categorized map information has a distribution situation of the measurement quantities in the most recent period similar to the data area of that piece of second categorized map information. Therefore, in the abnormality cause inferring unit 91, the measurement quantities of the vehicle detector 2 to be assessed in the most recent period are compared with the data areas in the pieces of second categorized map information, and when a piece of second categorized map information having a data area that is the most similar to the distribution range of the measurement quantities of the vehicle detector 2 in the most recent period is selected, the abnormality cause associated with this piece of second categorized map information can be inferred to be the abnormality cause of the vehicle detector 2 to be assessed.

In this case, pieces of second categorized map information categorized in accordance with the second set of categorization conditions (refer to FIG. 5 (B)) are used. Further, when comparing the measurement quantities of a vehicle detector 2 with the pieces of second categorized map information, it is preferred to extract pieces of second categorized map information related to the categories whose conditions excluding the abnormality cause (specifically, conditions regarding the installation point of the vehicle detector 2 and the green time ratio of the traffic signal) match those of the vehicle detector 2, and to select the most appropriate piece of second categorized map information from them based on the comparison with the measurement quantities of the vehicle detector 2.

Also, the abnormality cause inferring unit 91 may be configured to obtain the second individualized map information from the second individualized map information accumulation unit 88, and with a procedure similar to that described above with regard to the second categorized map information, select a piece of second individualized map information having a data area that is the most similar to the distribution range of the measurement quantities of the vehicle detector 2 to be assessed in the most recent period, to thereby infer that the abnormality cause of the vehicle detector 2 associated with the selected piece of second individualized map information is the abnormality cause of the vehicle detector 2 to be assessed. Further, the abnormality cause may be determined taking into account both of the inference result based on the second categorized map information and the inference result based on the second individualized map information.

Figure 13:
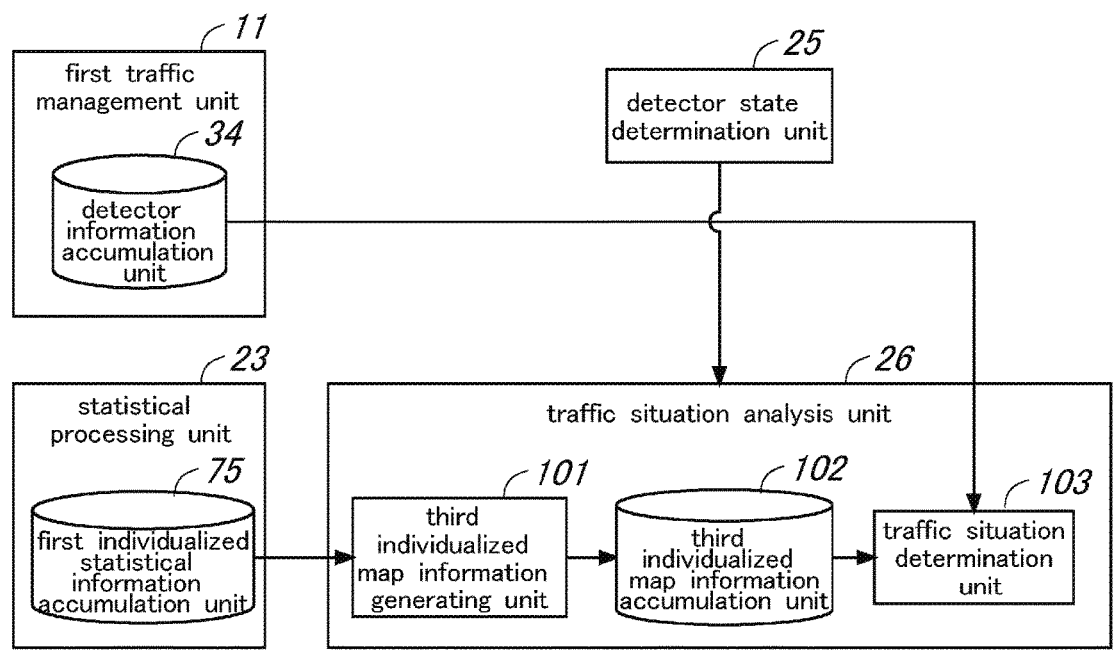
FIG. 13 is a functional block diagram for explaining the process executed by a traffic situation analysis unit 26.
Figure 14:
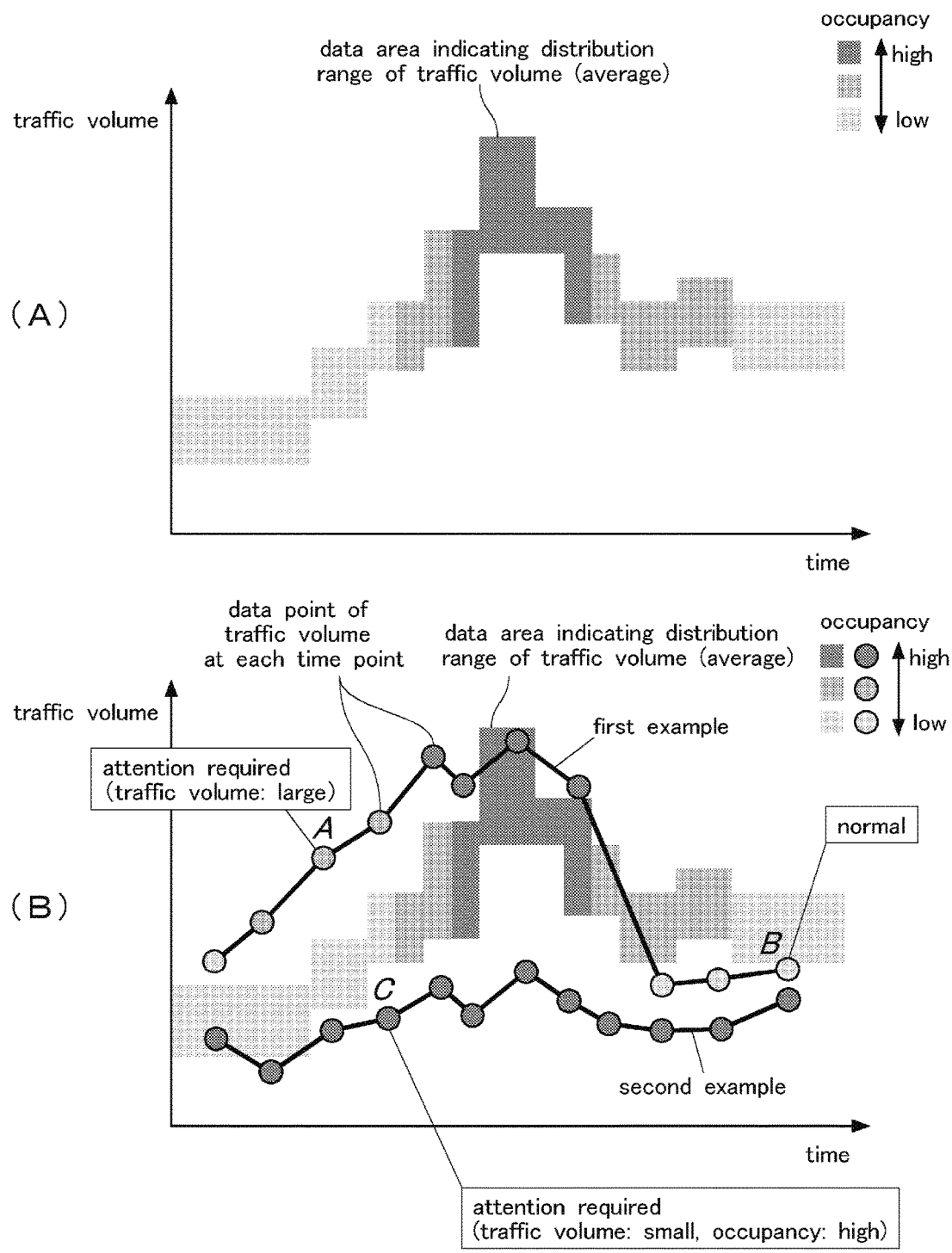
FIG. 14 is an explanatory diagram illustrating in (A) and (B) a third individualized map visualizing third individualized map information used by the traffic situation analysis unit 26.

Next, description will be made of the process executed by the traffic situation analysis unit 26 shown in FIG. 1. FIG. 13 is a functional block diagram for explaining the process executed by the traffic situation analysis unit 26. FIG. 14 an explanatory diagram illustrating a third individualized map visualizing third individualized map information used in the traffic situation analysis unit 26.

In a road network, a lane restriction caused by a temporarily occurring obstructive factor, such as a traffic accident, can change the traffic situation from the situation in an ordinary time. If this traffic situation abnormality is presented to the user, the user can note that the traffic situation is significantly different from the ordinary situation, and can make a decision regarding the traffic guidance, traffic signal intervention, etc. properly.

Therefore, in the present embodiment, the traffic situation analysis unit 26 executes a process of obtaining the determination result from the detector state determination unit 25, and based on the determination result, compares the traffic situation represented by the measurement quantities of each of the vehicle detectors 2 that were not determined to be abnormal, namely, the vehicle detectors 2 that were determined to be normal or to require attention, with the traffic situation in an ordinary time, to determine whether the traffic situation represented by the measurement quantities of each of these vehicle detectors 2 is abnormal.

As shown in FIG. 13, this traffic situation analysis unit 26 includes a third individualized map information generating unit 101, a third individualized map information accumulation unit 102, and a traffic situation determination unit 103.

The third individualized map information generating unit 101 executes a process of obtaining the first individualized statistical information regarding each vehicle detector 2 from the first individualized statistical information accumulation unit 75, and based on this first individualized statistical information, generating third individualized map information regarding the vehicle detector 2. The third individualized map information generated by the third individualized map information generating unit 101 is accumulated in the third individualized map information accumulation unit 102.

The third individualized map information represents, for each time slot in a given period (one month, for example) of interest in the past, a distribution situation of the statistical values of the measurement quantities (traffic volume (average±standard deviation) and occupancy (average±standard deviation) for each time slot). By visualizing the third individualized map information, a third individualized map as illustrated in FIG. 14 (A) is obtained.

In this third individualized map, the vertical and horizontal axes represent the traffic volume and the time, respectively, and a data area representing the distribution range (existence range) of the traffic volume (average±standard deviation) for each time slot is defined. This data area represents the distribution range of the traffic volume (average±standard deviation) in an ordinary time for each time slot. Further, the data area is colored such that the display color represents the degree of the occupancy (average±standard deviation). In the example shown in FIG. 14 (A), the degree of occupancy is expressed by the shade of the display color; a darker shade corresponds to a higher occupancy, and a lighter shade corresponds to a lower occupancy.

As shown in FIG. 13, the traffic situation determination unit 103 executes a process of: obtaining the third individualized map information regarding the vehicle detector 2 to be assessed from the third individualized map information accumulation unit 102; obtaining the measurement quantities of the vehicle detector 2 to be assessed in the most recent period (such as one day, for example) from the detector information accumulation unit 34; and, based on these pieces of information, determine whether the traffic situation represented by the measurement quantities is abnormal. In this process, by comparing the measurement quantities of the vehicle detectors 2 to be assessed in the most recent period (such as one day, for example) with the third individualized map information, whether the traffic situation represented by the measurement quantities of the vehicle detector 2 to be assessed is abnormal is determined.

FIG. 14 (B) visually shows the process executed by the traffic situation determination unit 103. Here, of the measurement quantities (traffic volume and occupancy) regarding the vehicle detector 2 to be assessed, data points representing the degree of traffic volume at respective time points are plotted on the third individualized map shown in FIG. 14 (A), while a line graph connecting the data points is depicted. Further, the degree of occupancy at each time point is expressed by the display color of a circular mark representing each data point. In the example shown in FIG. 14 (B), the degree of occupancy is expressed by the shade of the display color of the mark; a darker shade corresponds to a higher occupancy, and a lighter shade corresponds to a lower occupancy.

Here, the measurement quantities of the assessed vehicle detectors 2 in a given period (one month, for example) of interest in the past, namely, the data area representing the distribution range of the measurement quantities in an ordinary time, are compared with the data points representing the measurement quantities of this vehicle detector 2 at respective time points in the most recent period, to determine whether the traffic situation is abnormal based on the positional relationship between the data area and the data points. Namely, if a data point is within the data area, the traffic situation in the corresponding time slot is determined to be "normal," while if a data point is outside the data area considerably, the traffic situation in the corresponding time slot is determined to be "abnormal".

At this time, the assessment of the traffic situation should be preferably made on a multi-grade scale taking the standard deviation into account. Specifically, if the data point representing the traffic volume at each time point is within the data area representing the distribution range of the traffic volume (average±standard deviation) in an ordinary time, it is determined to be "normal," if the data point is outside a range defined by expanding the data area upward and downward by $k \cdot \sigma$, it is determined to be "abnormal," and in the other cases, it is determined that "attention is required." It is to be noted that description was made here of an example in which the traffic situation was assessed based on only the traffic volume, but in the present embodiment, the traffic situation is assessed based on two points of view, namely, the traffic volume and occupancy.

Also, though the data area was constituted of a range defined by average±σ (standard deviation) in the example described here, the data area may be set to be divided into two sections; one constituted of a range defined by the average±σ, the other constituted of a range extending from the average+σ to the average+k·σ and a range extending from the average—σ to the average–k·σ. Further, though the degree of occupancy was expressed here by the display color of the data area representing the distribution range of the traffic volume, it is also possible to set a distribution region in a three-dimensional space with axes corresponding to the traffic volume, occupancy, and time, respectively.

FIG. 14 (B) shows two examples in which the traffic situation represented by the measurement quantities of the vehicle detector 2 becomes abnormal. The first example includes a state where the occupancy is the same as in an ordinary time but the traffic volume is larger than in an ordinary time. The second example includes a state where the traffic volume is smaller than in an ordinary time and the occupancy is higher than in an ordinary time. At data point A in the first example, the traffic volume is large and accordingly it is determined that "attention is required," and at data point B, the traffic volume is substantially the same as in an ordinary time and accordingly it is determined "normal." At data point C in the second example, the traffic volume is smaller than in an ordinary time and the occupancy is higher than in an ordinary time and accordingly it is determined that "attention is required."

It is to be noted that in the present embodiment, the determination was performed based on the two points of view corresponding to the two measurement quantities, namely, the traffic volume and occupancy, but the determination may be made based on only on one of the two points of view corresponding to the traffic volume and occupancy. Further, the maps and graphs shown in FIG. 14 are illustrated visually for the convenience of explaining the process, and these maps and graphs are not actually depicted by the traffic situation analysis unit 26.

Figure 15:
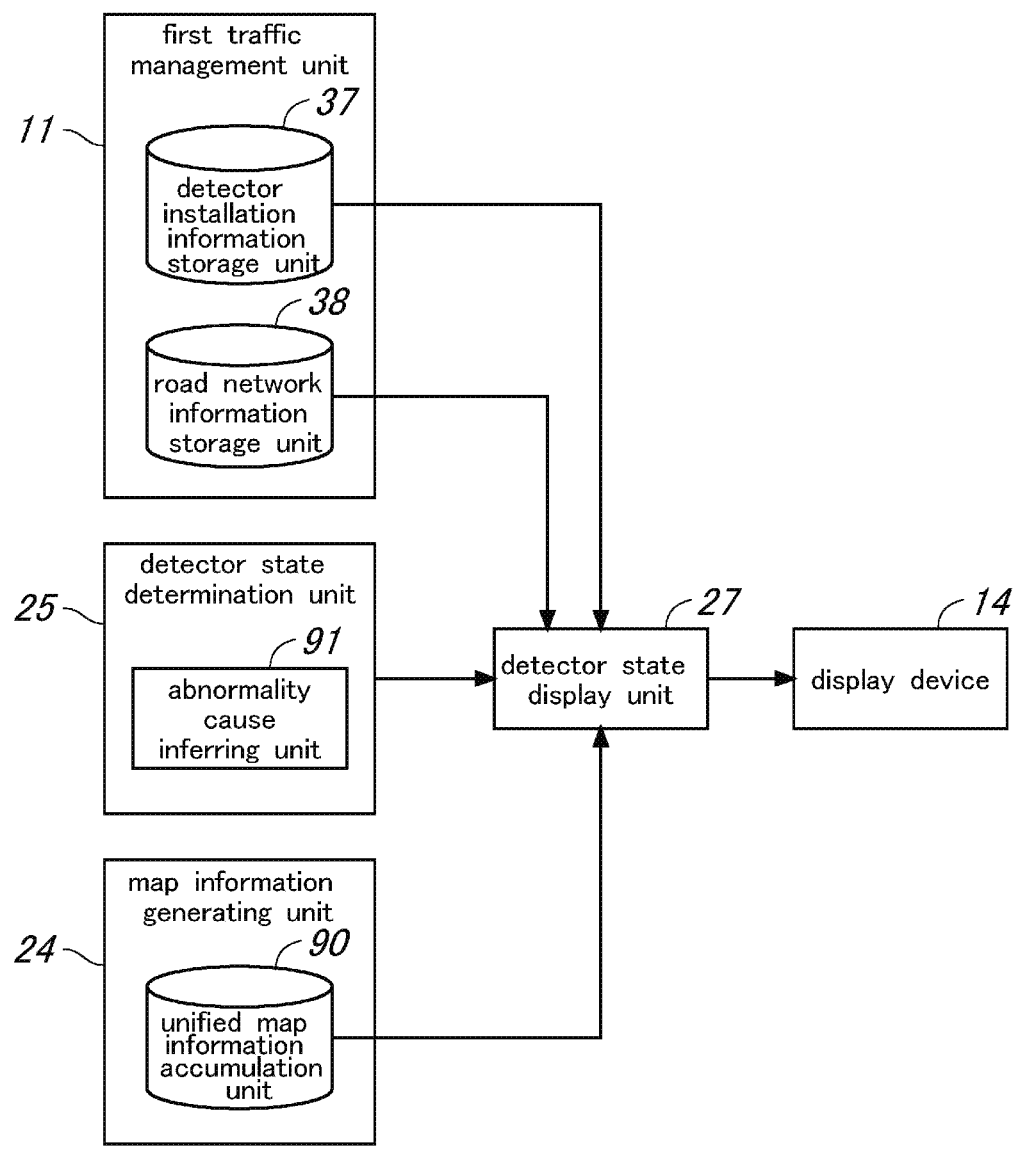
FIG. 15 is a functional block diagram for explaining the process executed by a detector state display unit 27.
Figure 16:
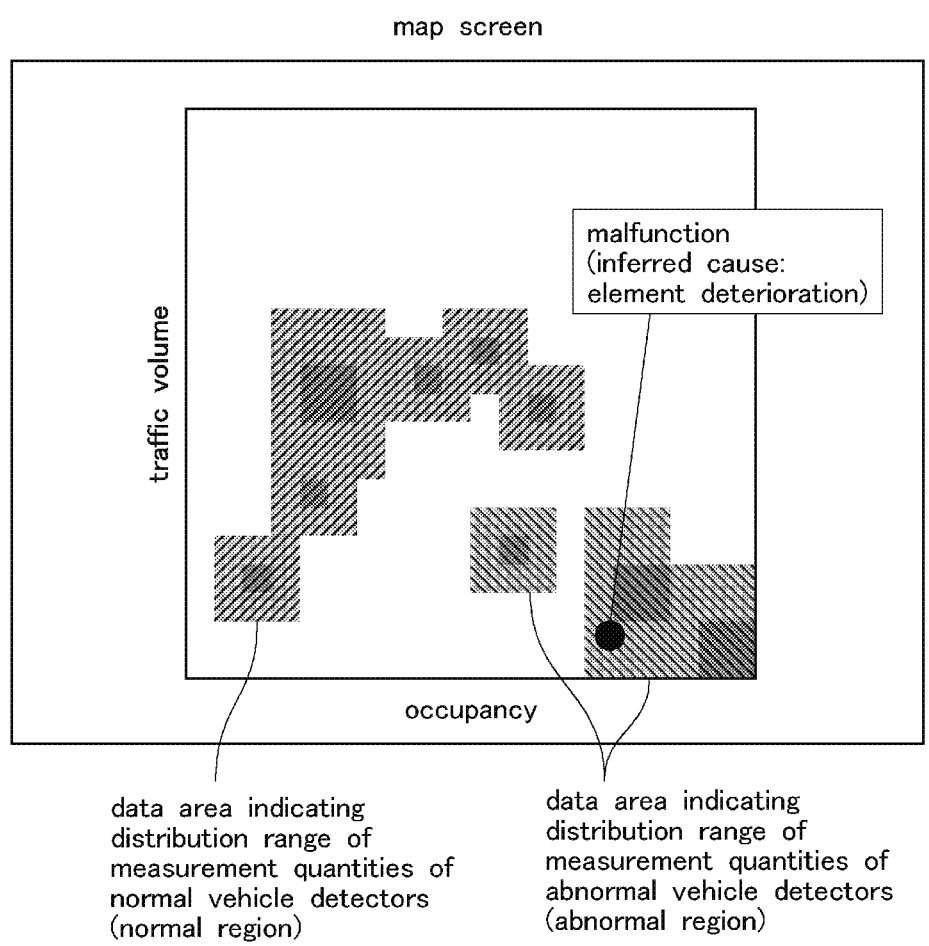
FIG. 16 is an explanatory diagram illustrating a screen displayed by the detector state display unit 27.

Next, description will be made of the process executed by the detector state display unit 27 shown in FIG. 1. FIG. 15 is a functional block diagram for explaining the process executed by the detector state display unit 27. FIG. 16 is an explanatory diagram illustrating a screen displayed by the detector state display unit 27.

As shown in FIG. 15, the detector state display unit 27 executes a process of obtaining the determination result from the detector state determination unit 25, and based on the determination result, causing the display device 14 to display screens related to the vehicle detectors 2 that have been determined to be abnormal. In the following, an example of the screen displayed by the detector state display unit 27 will be described.

First, the detector state display unit 27 causes the display device 14 to display a screen in which marks (icons) representing the vehicle detectors 2 are displayed on the road network, and in this screen, causes the marks of the vehicle detectors 2 determined to be abnormal to be displayed distinguishably from the marks of the other vehicle detectors 2. For example, the marks of the vehicle detectors 2 are displayed to blink (flicker) or in a color different from the color of the other vehicle detectors 2. In this case, the detector state display unit 27 obtains the determination result from the detector state determination unit 25, the detector installation information from the detector installation information storage unit 37, and the road network information from the road network information storage unit 38, and based on these pieces of information, generates display information regarding the road network screen.

Further, the detector state display unit 27 causes the display device 14 to display a screen showing a list of pieces of information regarding each vehicle detector 2. In this screen are shown pieces of information regarding the date and time, detector number, state of the vehicle detector 2 (abnormal, attention required, etc.), abnormality causes, etc. In this case, the detector state display unit 27 obtains the determination result from the detector state determination unit 25 and the inference result from the abnormality cause inferring unit 91, and based on these pieces of information, generates the display information regarding the list screen.

Preferably, an arrangement is made such that the list screen is displayed in response to an operation (clicking) of the mark of a vehicle detector 2 on the road network screen. It is also preferred if the list can be output from a printer as a report.

Further, as illustrated in FIG. 16, the detector state display unit 27 displays a map screen showing a data distribution map on the display device 14. In this map screen, the unified map as illustrated in FIG. 10 (A) is shown as the data distribution map, and on this unified map, a mark representing the data point of the vehicle detector 2 determined to be abnormal is displayed. In this unified map, by comparing the data area representing distribution range of the measurement quantities of the vehicle detectors 2 operating normally (normal region), the data area representing the distribution range of the measurement quantities of the abnormal vehicle detectors 2 (abnormal region), and the data point of the vehicle detector 2 to each other, one can understand the degree of abnormality of the vehicle detector 2. Further, in the map screen, the abnormality cause of the vehicle detector 2 is displayed.

In this case, the detector state display unit 27 obtains the determination result from the detector state determination unit 25, the inference result from the abnormality cause inferring unit 91, and the unified map information from the unified map information accumulation unit 90, and based on these pieces of information, generates the display information regarding the map screen.

It is to be noted that in the example shown in FIG. 16, the unified map as show in FIG. 10 (A) was used as the data distribution map, but as was illustrated in FIG. 10 (B), it is also possible to display the line segments defining the data areas and/or images expressing the entirety of the data areas (hatched areas shown in FIG. 10 (B)). Also, the second categorized map as shown in FIGS. 9 (A) and 9 (B) may be used as the data distribution map.

Figure 17:
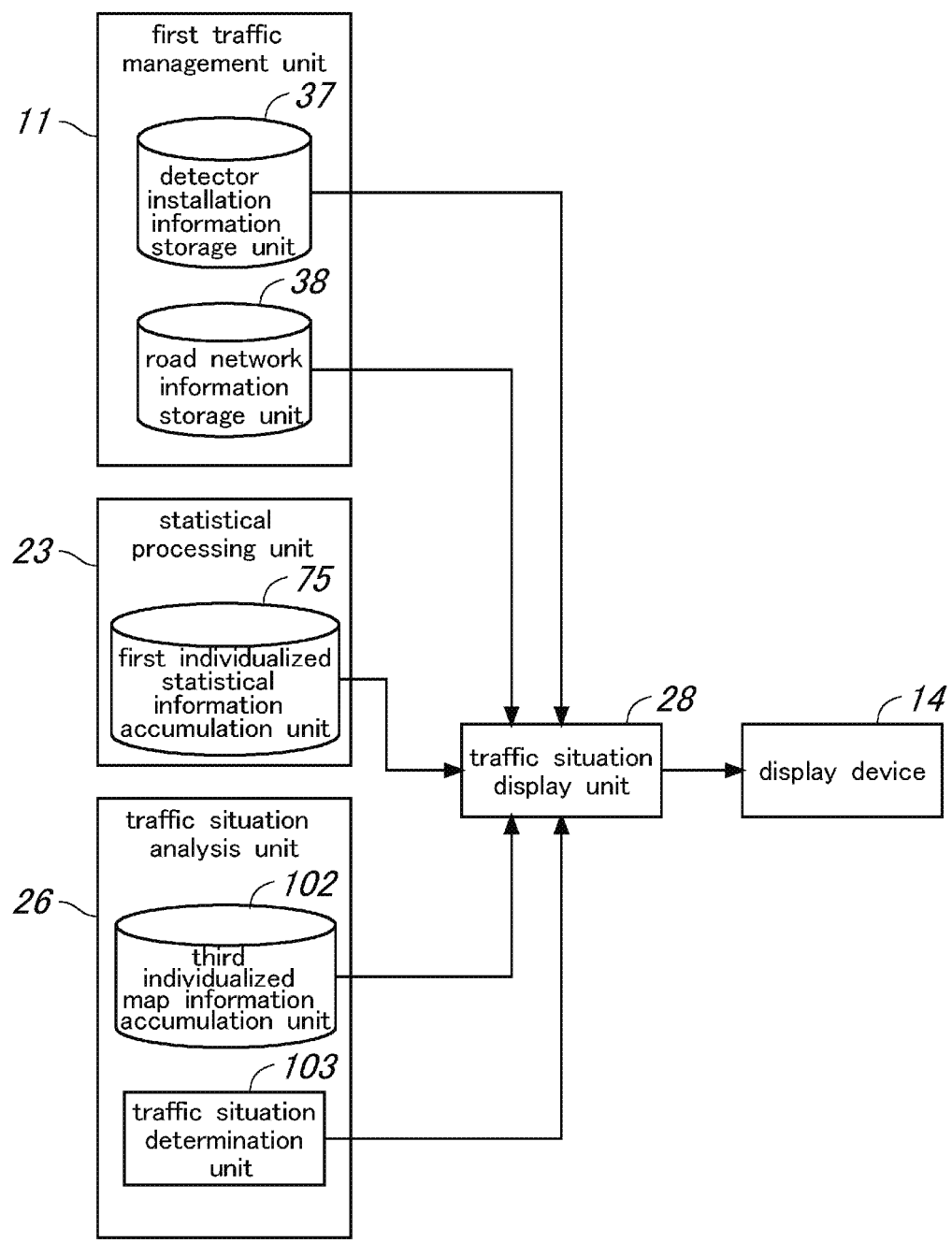
FIG. 17 is a functional block diagram for explaining the process executed by a traffic situation display unit 28.
Figure 18:
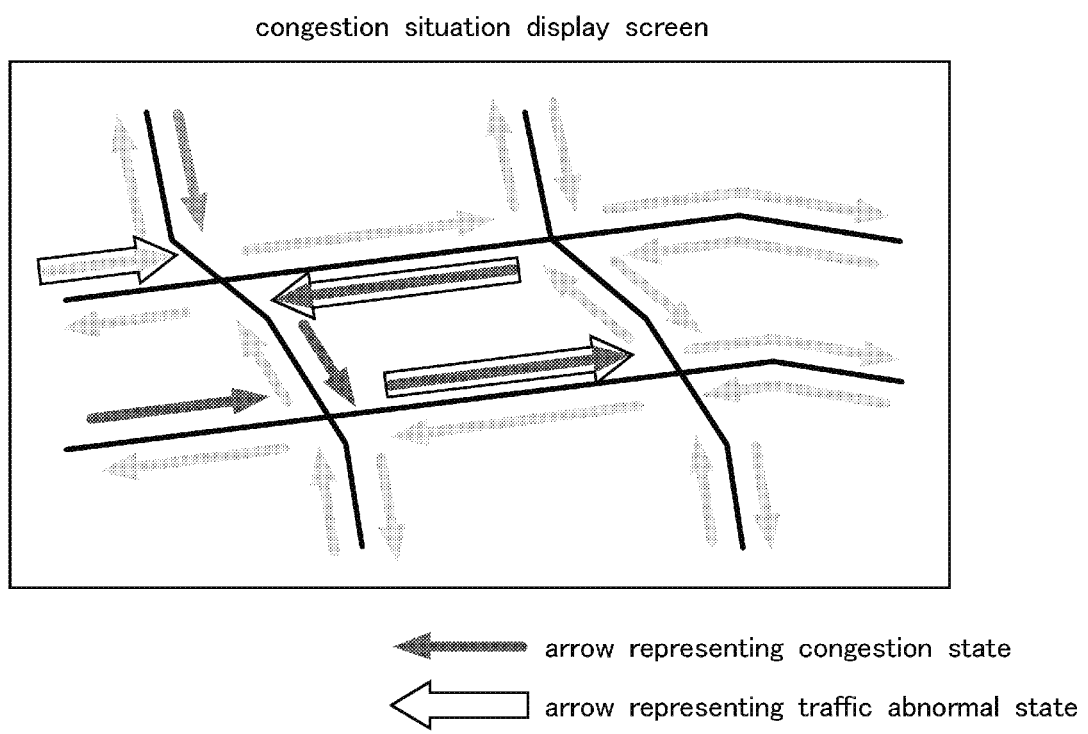
FIG. 18 is an explanatory diagram illustrating a screen displayed by the traffic situation display unit 28.
Figure 19:
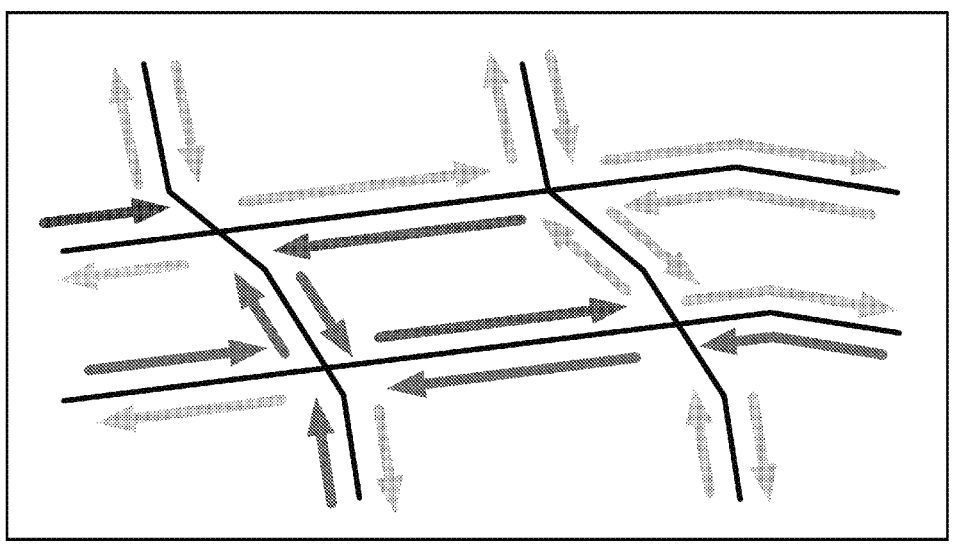
FIG. 19 is an explanatory diagram illustrating a screen displayed by the traffic situation display unit 28.

Next, description will be made of the process executed by the traffic situation display unit 28 shown in FIG. 1. FIG. 17 is a functional block diagram for explaining the process executed by the traffic situation display unit 28. FIG. 18 and FIG. 19 are each an explanatory diagram illustrating a screen displayed by the traffic situation display unit 28.

As shown in FIG. 17, the traffic situation display unit 28 executes a process of obtaining the determination result from the traffic situation determination unit 103, and based on the determination result, causing the display device 14 to display a screen regarding the abnormality of the traffic situation. In the following, an example of the screen displayed by the traffic situation display unit 28 will be described.

First, as illustrated in FIG. 18, the traffic situation display unit 28 displays a congestion situation display screen regarding the congestion situation at each link of the road network on the display device 14. In this congestion information display screen, the road network and arrow images expressing the congestion state of the respective links of this road network are displayed. The arrow images expressing the congestion state are depicted in different display colors depending on the presence/absence and the degree of traffic congestion.

Further, in this congestion situation display screen, the links with an abnormal traffic situation, namely, the links where the vehicle detectors 2 with regard to which the traffic situation has been determined to be abnormal by the traffic situation determination unit 103 are installed, are displayed distinguishably. In the present embodiment, each link with an abnormal traffic situation is displayed with an arrow image representing a state in which the traffic situation is abnormal (hereinafter referred to as a traffic abnormal state). This allows the user to grasp that, at each link displayed with such an arrow, the congestion state displayed in the congestion information display screen is different from the state in an ordinary time.

Here, because the congestion state and the traffic abnormal state regarding each link are displayed in the same congestion situation display screen, it is preferred if the congestion state and the traffic abnormal state regarding each link can be switchably displayed. Namely, it is preferred if the arrow images representing the congestion state and the arrow images representing the traffic abnormal state are displayed alternately. Further, the arrow images representing the traffic abnormal state are preferably depicted in a shape different from the shape of the arrow images representing the congestion state. It is also possible that these arrow images have the same shape but different colors.

By displaying the traffic abnormal state on the congestion situation display screen as described above, the user is allowed to examine the congestion situation at each link while taking into account an abnormality of the traffic situation, and thus, the user can make a decision on the traffic guidance, traffic signal intervention, etc. properly. Further, by alternately displaying the arrow images representing the congestion state and the arrow images representing the traffic abnormal state, it is possible to absolve the user from switching the screen, without making the screen display complicated.

In this case, the traffic situation display unit 28 obtains the determination result from the traffic situation determination unit 103, the detector installation information from the detector installation information storage unit 37, the road network information from the road network information storage unit 38, and congestion situation information generated by the first traffic management unit 11 or the second traffic management unit 12, and based on these pieces of information, generates the display information regarding the congestion situation display screen.

Further, as illustrated in FIG. 19, the traffic situation display unit 28 displays a traffic volume level display screen regarding the degree of abnormality of the traffic volume at each link of the road network on the display device 14. In this traffic volume level display screen, the display color of the arrow image displayed with each link is varied depending on the level of the traffic volume (degree of abnormality). The degree of abnormality of the traffic volume may be classified into multiple levels with reference to the average and standard deviation a of the traffic volume. In the example shown in FIG. 19, the traffic volume is classified into five levels; namely, equal to or larger than the average+$k \cdot \sigma$, from the average+$k \cdot \sigma$ to the average+$\sigma$, from the average+$\sigma$ to the average—$\sigma$, from the average—$\sigma$ to the average—$k \cdot \sigma$, and equal to or smaller than the average—$k \cdot \sigma$, and the display color of the arrow image is changed depending on the level of the traffic volume, such that, for example, levels of the traffic volume is represented by red, orange, green, blue, and purple.

In this case, the traffic situation display unit 28 obtains the determination result from the traffic situation determination unit 103, the detector installation information from the detector installation information storage unit 37, and the road network information from the road network information storage unit 38, and based on these pieces of information, generate the display information regarding the traffic volume level display screen.

Further, the traffic situation display unit 28 causes the display device 14 to display a screen showing a list of piece of traffic situation information containing information regarding an abnormality of the traffic situation. In this screen, as the pieces of traffic situation information, are shown pieces of information regarding the date and time, detector number, abnormality level of the traffic volume, average of the traffic volume, average of the occupancy, etc. In this case, the traffic situation display unit 28 obtains the determination result from the traffic situation determination unit 103 and the first individualized statistical information regarding each vehicle detector 2 from the first individualized statistical information accumulation unit 75, and based on these pieces of information, generate the display information regarding the list screen.

Preferably, an arrangement is made such that in response to selection (clicking) of a link on the congestion situation display screen shown in FIG. 18 or the traffic volume level display screen shown in FIG. 19, the list screen associated with the vehicle detector 2 installed at the link. It is also preferred if the list can be output from a printer as a report.

Further, the traffic situation display unit 28 displays a map screen showing the third individualized map as illustrated in FIG. 14 (B) on the display device 14. As described above, in this third individualized map, the data area representing the distribution range of the traffic volume (average±standard deviation) for each time slot indicates the traffic situation measured by the vehicle detector 2 in an ordinary time, and if a measurement quantity of the vehicle detector 2 is considerably outside the data area, it can be determined that the traffic situation is abnormal. The traffic situation determination unit 103 was configured to determine whether the traffic situation is abnormal by use of the third individualized map information, while the traffic situation display unit 28 presents the third individualized map visualizing the third individualized map information to the user, to allow the user to visually confirm an abnormality of the traffic situation. Thereby, the user can grasp the degree of abnormality of the traffic situation user concretely.

In this case, the traffic situation display unit 28 obtains the third individualized map information from the third individualized map information accumulation unit 102, and based on this third individualized map information, generates the display information regarding the map screen.

As described above, in the present embodiment, an arrangement is made such that the detector information collecting unit 31 collects the detector information including the measurement quantities from the vehicle detectors 2, the map information generating unit 24 generates, based on the measurement quantities of the vehicle detectors 2 that already have been determined to be abnormal by the user, the map information representing the distribution situation of the measurement quantities in the abnormal state, and the detector state determination unit 25 determines, based on the measurement quantities of the vehicle detector 2 to be assessed and the map information in the abnormal state, whether the vehicle detector 2 is abnormal. Therefore, by comparing the map information representing the distribution situation of the measurement quantities in the abnormal state and the measurement quantities of the vehicle detector 2 to be assessed, an abnormality of the vehicle detector 2 can be detected with high accuracy. Further, because the present embodiment does not require a device for collecting information other than the vehicle detectors 2, the present embodiment is highly feasible and can be realized at a relatively low cost with a center device of a traffic control system.

Further, in the present embodiment, an arrangement is made such that the statistical processing unit 23 statistically processes the measurement quantities for each designated period to thereby generate statistical information including the statistical values of the measurement quantities, and the map information generating unit 24 generates map information in the abnormal state based on the statistical values of the measurement quantities. Thus, because the measurement quantities are statistically processed, it is possible to suppress an influence of noises (disturbances) contained in the measurement quantities and thereby improve the accuracy of abnormality detection of the vehicle detectors 2.

Further, in the present embodiment, an arrangement is made such that the categorizing unit 22 classifies the vehicle detectors 2 into a plurality of categories in accordance with a prescribed categorization condition regarding a factor having an influence on the traffic situation at the installation points of the vehicle detectors 2, the map information generating unit 24 generates categorized map information representing the distribution situation of the measurement quantities for each category, and the detector state determination unit 25 determines whether each vehicle detector 2 is abnormal based on the categorized map information. Thereby, with the use of the categorized map information, an abnormality of the vehicle detector 2 can be detected with high accuracy.

Namely, with only one vehicle detector 2, the number of samples of measurement quantities for generating the map information is small, but by categorizing the vehicle detectors 2 and unifying the measurement quantities of the same category, it is possible to increase the number of samples of the measurement quantities, and therefore, it is possible to improve the accuracy of abnormality detection of the vehicle detectors 2. Further, depending on the installation situation of the vehicle detectors 2, the map information representing the distribution situation of the measurement quantities can vary considerably, and in such a case, with only one piece of map information, a false detection may occur. However, by use of pieces of categorized map information categorized in accordance with the installation situations of the vehicle detectors 2, it is possible to improve the accuracy of abnormality detection of the vehicle detectors 2.

Further, in the present embodiment, an arrangement is made such that the categorizing unit 22 classifies the vehicle detectors 2 that already have been determined to be abnormal by the user into a plurality of categories in accordance with a prescribed categorization condition regarding the abnormality causes of the vehicle detectors 2, the map information generating unit 24 generates categorized map information representing the distribution situation of the measurement quantities for each category, and the detector state determination unit 25 determines whether each vehicle detector 2 is abnormal based on the categorized map information. Thereby, with the use of the map information generated for each category divided based on the abnormality causes, an abnormality of the vehicle detector 2 can be detected with high accuracy.

Further, in the present embodiment, an arrangement is made such that the detector state determination unit 25 infers an abnormality cause of the vehicle detector 2 to be assessed based on the categorized map information. Thereby, when the vehicle detector 2 to be assessed is determined to be abnormal, the cause of the abnormality can be presented to the traffic manager. In addition, the use of the map information generated for each abnormality cause allows the abnormality cause to be inferred with high accuracy.

Further, in the present embodiment, an arrangement is made such that the map information generating unit 24 generates map information representing the distribution situation of the measurement quantities in the normal state based on the measurement quantities of the vehicle detectors 2 that have not been determined to be abnormal by the user, and the detector state determination unit 25 determines, based on the map information in the abnormal state and the map information in the normal state, whether the vehicle detector 2 is abnormal, normal, or in a state that requires attention. Thereby, it is possible to determine whether the vehicle detector 2 to be assessed is normal. In addition, it is possible to determine whether the vehicle detector 2 to be assessed is in a state that requires attention, which is a state neither normal nor abnormal.

Further, in the present embodiment, an arrangement is made such that the categorization condition pertains to the distance from each vehicle detector 2 to the signal intersection having an incoming road consisting of the road where the vehicle detector 2 is installed, the green time ratio associated with the incoming road of the traffic signal installed at the signal intersection, and whether the vehicle detector 2 is installed above a right turn only lane. Thereby, the vehicle detectors 2 can be categorized properly, and therefore, the abnormality detection of the vehicle detectors 2 based on the map information can be performed with high accuracy.

Further, in the present embodiment, an arrangement is made such that the map information generating unit 24 excludes, from the data to be processed, the measurement quantities during the period when at least one of a special event and a traffic restriction is occurring. This makes it possible to prevent the measurement quantities during the period when a special event, such as a natural disaster or an entertainment event, or a traffic restriction is occurring from being reflected in the map information, and therefore, the accuracy of the map information as information representing the abnormal state and normal state of the vehicle detectors 2 themselves can be improved.

Further, in the present embodiment, an arrangement is made such that the statistical processing unit 23 excludes, from the data to be processed, the measurement quantities during the period when at least one of a special event and a traffic restriction is occurring. This makes it possible to prevent the measurement quantities during the period when a special event, such as a natural disaster or an entertainment event, or a traffic restriction is occurring from being reflected in the statistical information, and therefore, the accuracy of the statistical information as information representing the abnormal state and normal state of the vehicle detectors 2 themselves can be improved.

Further, in the present embodiment, the map information is based on the combination of the traffic volume and occupancy, and this make it possible to detect an abnormality of the vehicle detectors 2 with high accuracy based on the map information.

Further, in the present embodiment, an arrangement is made such that the traffic situation determination unit 103 determines whether the traffic situation represented by the measurement quantities of the vehicle detectors 2 that were not determined to be abnormal is abnormal, and the traffic situation display unit 28 displays, on the display device 14, an abnormality of the traffic situation based on the determination result of the traffic situation determination unit 103. This make it possible to properly analyze the traffic situation based on the measurement quantities of the vehicle detectors 2 and to present an abnormality of the traffic situation to the user with high accuracy.

Further, in the present embodiment, an arrangement is made such that, based on the determination result of the traffic situation determination unit 103, the traffic situation display unit 28 distinguishably displays, in the screen showing the traffic situation at each link of the road network, the links corresponding to the vehicle detectors 2 with regard to which the traffic situation has been determined to be abnormal. This allows the user to grasp the links with an abnormal traffic situation.

Further, in the present embodiment, an arrangement is made such that, based on the determination result of the traffic situation determination unit 103, the traffic situation display unit 28 distinguishably displays, in the screen showing the traffic situation at each link of the road network, the degree of abnormality of the traffic volume at each of the links corresponding to the vehicle detectors 2. This allows the user to grasp the degree of abnormality of the traffic volume at each link.

Further, in the present embodiment, an arrangement is made such that the third individualized map information generating unit 101 generates, for each vehicle detector 2, third individualized map information representing the distribution situation of the measurement quantities for each time slot in a given period of interest in the past, and the traffic situation determination unit 103 determines, based on the measurement quantities of the vehicle detector 2 to be assessed in the most recent period and the third individualized map information regarding the vehicle detector 2, whether the traffic situation related to the vehicle detector 2 is abnormal. This makes it possible to determine whether the traffic situation related to the vehicle detector 2 to be assessed is abnormal with high accuracy.

Further, in the present embodiment, an arrangement is made such that the traffic situation display unit 28 displays, on the map image visualizing the third individualized map information regarding the vehicle detector 2 to be assessed, a screen in which the measurement quantities of the vehicle detector 2 in the most recent period are plotted. Thus, by comparing the map image representing the distribution situation of the measurement quantities of the vehicle detector 2 to be assessed for each time slot and the measurement quantities of the vehicle detector 2 in the most recent period, the user can grasp the abnormality situation of the traffic situation represented by the measurement quantities of the vehicle detector 2 in detail.

In the foregoing, the present invention has been described in terms of specific embodiments, but these embodiments are mere examples and the present invention is not limited by these embodiments. It is also to be noted that not all of the structural elements of the abnormality detection device as shown in the above embodiments of the present invention are necessarily indispensable, and they may be selectively used as appropriate without departing from the scope of the present invention.

For instance, in the above-described embodiment, two-dimensional map information based on two types of measurement quantities (traffic volume and occupancy) was generated, but map information of one dimension based on one type of measurement quantity may be generated or map information of three or more dimensions based on three or more measurement quantities may be generated.

Further, in the above-described embodiment, to infer the abnormality causes of the vehicle detectors, the vehicle detectors were categorizes in accordance with the categorization conditions regarding the factors having an influence on the traffic situation at the installation points of the vehicle detectors and the abnormality causes of the vehicle detectors as was illustrated in FIG. 5 (B), but the vehicle detectors may be categorized based on the categorization conditions regarding only the abnormality causes of the vehicle detectors.

Further, in the above-described embodiment, description was made of the traffic control center device 1 as an abnormality detection device, but this traffic control center device 1 is actually constituted of a plurality of computers connected by a network, and there are various ways of how to realize the units of the traffic control center device 1 with the computers. However, they can be generally divided into a first device constituting the first traffic management unit 11 and a second constituting the second traffic management unit 12.

The abnormality detection device, abnormality detection system, and program of the present invention have advantages that they do not require a device for collecting information other than the vehicle detectors but can detect an abnormality of the vehicle detectors with high accuracy, and in addition, that they can analyze the traffic situation based on the measurement quantities of the vehicle detectors properly and present an abnormality of the traffic situation to the user with high accuracy. Thus, they are useful as an abnormality detection device and an abnormality detection system for detecting an abnormality of the vehicle detectors installed in a road network, and a program for causing a computer to function as the abnormality detection device.

GLOSSARY 1 traffic control center device (abnormality detection device, computer)
2 vehicle detectors
3 traffic signal
11 first traffic management unit (first device)
12 second traffic management unit (second device)
14 display device
22 categorizing unit
23 statistical processing unit
24 map information generating unit
25 detector state determination unit
26 traffic situation analysis unit
27 detector state display unit
28 traffic situation display unit
31 detector information collecting unit
35 signal control information accumulation unit
36 traffic restriction information accumulation unit
37 detector installation information storage unit
38 road network information storage unit
41 special event information accumulation unit
42 abnormal event information accumulation unit
71 first individualized statistical information generating unit
72 first categorized statistical information generating unit
73 second individualized statistical information generating unit
74 second categorized statistical information generating unit
81 first individualized map information generating unit
82 first categorized map information generating unit
83 second individualized map information generating unit
84 second categorized map information generating unit
85 unified map information generating unit
90 unified map information accumulation unit
91 abnormality cause inferring unit
101 third individualized map information generating unit
103 traffic situation determination unit

The invention claimed is:

1. An abnormality detection device for detecting an abnormality of vehicle detectors installed in a road network, comprising:
a detector information collector that collects detector information including measurement quantities from the vehicle detectors;
a categorizer that classifies the vehicle detectors into a plurality of categories in accordance with a prescribed categorization condition regarding a factor having an influence on a traffic situation at installation points of the vehicle detectors, the categorization condition pertaining to a distance from each vehicle detector to a signal intersection having an incoming road consisting of a road where the vehicle detector is installed, a green time ratio associated with the incoming road of a traffic signal installed at the signal intersection, and whether the vehicle detector is installed above a right turn only lane;
a map information generator that generates, based on the measurement quantities of the vehicle detectors that already have been determined to be abnormal by a user, categorized map information representing a distribution situation of the measurement quantities in an abnormal state for each category; and
a detector state determiner that determines, based on the measurement quantity of each vehicle detector to be assessed and the categorized map information in the abnormal state, whether the vehicle detector is abnormal.

2. The abnormality detection device according to claim 1, further comprising:
a statistical processor that statistically processes the measurement quantities for each designated period to thereby generate statistical information including statistical values of the measurement quantities,
wherein the map information generator generates the categorized map information in the abnormal state based on the statistical values of the measurement quantities.

3. The abnormality detection device according to claim 1,
wherein the map information generator generates categorized map information representing the distribution situation of the measurement quantities in a normal state for each category based on the measurement quantities of the vehicle detectors that have not been determined to be abnormal by the user; and
the detector state determiner determines, based on the categorized map information in the abnormal state and the categorized map information in the normal state, whether the vehicle detector is abnormal, normal, or in a state that requires attention.

4. The abnormality detection device according to claim 1, wherein the map information generator excludes, from data to be processed, the measurement quantities during a period when at least one of a special event and a traffic restriction is occurring.

5. The abnormality detection device according to claim 2, wherein the statistical processor excludes, from data to be processed, the measurement quantities during a period when at least one of a special event and a traffic restriction is occurring.

6. The abnormality detection device according to claim 1, wherein the map information is based on a combination of a traffic volume and an occupancy.

7. The abnormality detection device according to claim 1, further comprising:
   a traffic situation determiner that determines whether a traffic situation represented by the measurement quantities of the vehicle detectors that were not determined to be abnormal by the detector state determiner is abnormal; and
   a traffic situation displayer that displays, on a display device, an abnormality of the traffic situation based on a determination result of the traffic situation determiner.

8. An abnormality detection device for detecting an abnormality of vehicle detectors installed in a road network, comprising:
   a detector information collector that collects detector information including measurement quantities from the vehicle detectors;
   a map information generator that generates, based on the measurement quantities of the vehicle detectors that already have been determined to be abnormal by a user, map information representing a distribution situation of the measurement quantities in an abnormal state;
   a detector state determiner that determines, based on the measurement quantity of each vehicle detector to be assessed and the map information in the abnormal state, whether the vehicle detector is abnormal;
   a traffic situation determiner that determines whether a traffic situation represented by the measurement quantities of the vehicle detectors that were not determined to be abnormal by the detector state determiner is abnormal; and
   a traffic situation displayer that based on the determination result of the traffic situation determiner, distinguishably displays, in a screen showing the traffic situation at each link of the road network, links corresponding to the vehicle detectors with regard to which the traffic situation has been determined to be abnormal.

9. An abnormality detection device for detecting an abnormality of vehicle detectors installed in a road network, comprising:
   a detector information collector that collects detector information including measurement quantities from the vehicle detectors;
   a map information generator that generates, based on the measurement quantities of the vehicle detectors that already have been determined to be abnormal by a user, map information representing a distribution situation of the measurement quantities in an abnormal state;
   a detector state determiner that determines, based on the measurement quantity of each vehicle detector to be assessed and the map information in the abnormal state, whether the vehicle detector is abnormal;
   a traffic situation determiner that determines whether a traffic situation represented by the measurement quantities of the vehicle detectors that were not determined to be abnormal by the detector state determiner is abnormal; and
   a traffic situation displayer based on the determination result of the traffic situation determiner, distinguishably displays, in a screen showing the traffic situation at each link of the road network, a degree of abnormality of the traffic volume at each of the links corresponding to the vehicle detectors.

10. The abnormality detection device according to claim 7, further comprising:
    a map information generator that generates, for each vehicle detector, individualized map information representing a distribution situation of the measurement quantities for each time slot in a given period of interest in the past,
    wherein the traffic situation determiner determines, based on the measurement quantities of the vehicle detector to be assessed in a most recent period and the individualized map information regarding the vehicle detector, whether the traffic situation related to the vehicle detector is abnormal.

11. The abnormality detection device according to claim 10, wherein the traffic situation displayer displays, on a map image visualizing the individualized map information regarding the vehicle detector to be assessed, a screen in which the measurement quantities of the vehicle detector in the most recent period are plotted.

12. An abnormality detection system for detecting an abnormality of vehicle detectors installed in a road network, comprising:
    a first device that, based on information obtained by the vehicle detectors, generates traffic information and controls traffic signals; and
    a second device provided additionally to the first device,
    wherein the first device comprises a detector information collector that collects detector information including measurement quantities from the vehicle detectors,
    and wherein the second device includes
    a categorizer that classifies the vehicle detectors into a plurality of categories in accordance with a prescribed categorization condition regarding a factor having an influence on a traffic situation at installation points of the vehicle detectors, the categorization condition pertains to a distance from each vehicle detector to a signal intersection having an incoming road consisting of a road where the vehicle detector is installed, a green time ratio associated with the incoming road of a traffic signal installed at the signal intersection, and whether the vehicle detector is installed above a right turn only lane;
    a map information generator that obtains the detector information from the first device, and generates, based on the measurement quantities of the vehicle detectors that already have been determined to be abnormal by a user, categorized map information representing a distribution situation of the measurement quantities in an abnormal state for each category; and
    a detector state determiner that determines, based on the measurement quantities of each vehicle detector to be assessed and the categorized map information in the abnormal state, whether the vehicle detector is abnormal.

13. The abnormality detection system according to claim 12, wherein the second device further includes
a traffic situation determiner that determines whether a traffic situation represented by the measurement quantities of the vehicle detectors that were not determined to be abnormal by the detector state determiner; and
a traffic situation displayer that displays, on the display device, an abnormality of the traffic situation based on a determination result of the traffic situation determiner.

14. An abnormality detection method, performed by a computer, for detecting an abnormality of vehicle detectors installed in a road network, the method comprising:
collecting detector information including measurement quantities from the vehicle detectors;
classifying the vehicle detectors into a plurality of categories in accordance with a prescribed categorization condition regarding a factor having an influence on a traffic situation at installation points of the vehicle detectors, the categorization condition pertaining to a distance from each vehicle detector to a signal intersection having an incoming road consisting of a road where the vehicle detector is installed, a green time ratio associated with the incoming road of a traffic signal installed at the signal intersection, and whether the vehicle detector is installed above a right turn only lane;
generating, based on the measurement quantities of the vehicle detectors that already have been determined to be abnormal by a user, categorized map information representing a distribution situation of the measurement quantities in an abnormal state for each category; and
determining, based on the measurement quantities of each vehicle detector to be assessed and the categorized map information in the abnormal state, whether the vehicle detector is abnormal.

15. The abnormality detection method according to claim 14, further comprising:
determining whether a traffic situation represented by the measurement quantities of the vehicle detectors that were not determined to be abnormal by the determining of whether the vehicle detector is abnormal is abnormal; and
displaying, on a display device, an abnormality of the traffic situation based on a determination result of the determining of whether the traffic situation is abnormal.

* * * * *